United States Patent [19]
Levin et al.

[11] Patent Number: 5,654,979
[45] Date of Patent: Aug. 5, 1997

[54] CELL SITE DEMODULATION ARCHITECTURE FOR A SPREAD SPECTRUM MULTIPLE ACCESS COMMUNICATION SYSTEMS

[75] Inventors: Jeffrey A. Levin; David E. Werner; Kenneth D. Easton, all of San Diego, Calif.

[73] Assignee: Qualcomm Incorporated, San Diego, Calif.

[21] Appl. No.: 372,632

[22] Filed: Jan. 13, 1995

[51] Int. Cl.$^6$ .................................................. H04B 14/707
[52] U.S. Cl. .......................................... 375/206; 370/342
[58] Field of Search .................................. 375/205, 202, 375/203, 206, 207, 208, 209, 267; 370/18, 21, 22; 379/59; 455/33.1, 54.1

[56] References Cited

U.S. PATENT DOCUMENTS

| | | | |
|---|---|---|---|
| 4,164,628 | 8/1979 | Ward et al. ........................... | 179/15 BA |
| 4,901,307 | 2/1990 | Gilhousen et al. ..................... | 370/18 |
| 5,056,109 | 10/1991 | Gilhousen et al. ..................... | 375/205 |
| 5,101,501 | 3/1992 | Gilhousen et al. ..................... | 455/33.2 |
| 5,103,459 | 4/1992 | Gilhousen et al. ..................... | 375/205 |
| 5,109,390 | 4/1992 | Gilhousen et al. ..................... | 375/205 |
| 5,329,549 | 7/1994 | Kawasaki ............................... | 375/1 |
| 5,442,627 | 8/1995 | Viterbi et al. ......................... | 370/22 |
| 5,465,269 | 11/1995 | Schaffner et al. ..................... | 375/200 |
| 5,490,105 | 2/1996 | Blakeney II et al. .................. | 375/205 |

FOREIGN PATENT DOCUMENTS

| | | | |
|---|---|---|---|
| 9107036 | 5/1991 | WIPO ................................ | H04L 27/30 |

OTHER PUBLICATIONS

Golomb et al, Digital Communications with Space Applications, 1964, pp.45–64.

*Primary Examiner*—Stephen Chin
*Assistant Examiner*—Kevin Kim
*Attorney, Agent, or Firm*—Russell B. Miller

[57] ABSTRACT

An integrated demodulation processor used in a modem for a spread spectrum communications system despreads multipath receive signals then uses a time sliced transform processor to process the multiple signals in to a single series of soft decision results. The demodulation processor uses a single transform engine which operates on a time slice basis. The output of the processor engine cascade through a pipeline processor which, on a time slice basis, operates on signals corresponding to each multipath receive signal. The processed results are dual maxima decoded to provide soft decision data.

94 Claims, 13 Drawing Sheets

CELL SITE DEMODULATION ARCHITECTURE FOR A SPREAD SPECTRUM MULTIPLE ACCESS COMMUNICATION SYSTEMS

BACKGROUND OF THE INVENTION

I. Field of the Invention

This invention relates generally to spread spectrum communication systems and, more particularly, to signal processing in a cellular telephone communication system.

II. Description of the Related Art

In a wireless telephone communication system, many users communicate over a wireless channel to connect to wireline telephone systems. Communication over the wireless channel can be one of a variety of multiple access techniques which facilitate a large number of users in a limited frequency spectrum. These multiple access techniques include time division multiple access (TDMA), frequency division multiple access (FDMA), and code division multiple access (CDMA). The CDMA technique has many advantages and an exemplary CDMA system is described in U.S. Pat. No. 4,901,307 issued Feb. 13, 1990 to K. Gilhousen et al., entitled "SPREAD SPECTRUM MULTIPLE ACCESS COMMUNICATION SYSTEM USING SATELLITE OR TERRESTRIAL REPEATERS," assigned to the assignee of the present invention and incorporated herein by reference.

In the just mentioned patent, a multiple access technique is disclosed where a large number of mobile telephone system users, each having a transceiver, communicate through satellite repeaters or terrestrial base stations using CDMA spread spectrum communication signals. In using CDMA communications, the frequency spectrum can be reused multiple times thus permitting an increase in system user capacity.

The CDMA modulation techniques disclosed in the '307 patent offers many advantages over narrow band modulation techniques used in communication systems using satellite or terrestrial channels. The terrestrial channel poses special problems to any communication system particularly with respect to multipath signals. The use of CDMA techniques permits the special problems of the terrestrial channel to be overcome by mitigating the adverse effect of multipath, e.g. fading, while also exploiting the advantages thereof.

The CDMA techniques as disclosed in the '307 patent contemplate the use of coherent modulation and demodulation for both directions of the link in mobile-satellite communications. Accordingly, disclosed therein is the use of a pilot carrier signal as a coherent phase reference for the satellite-to-mobile unit link and the base station-to-mobile unit link. In the terrestrial cellular environment, however, the severity of multipath fading with the resulting phase disruption of the channel, as well as the power required to transmit a pilot carrier signal from the mobile unit, precludes usage of coherent demodulation techniques for the mobile unit-to-base station link. U.S. Pat. No. 5,103,459 entitled "SYSTEM AND METHOD FOR GENERATING SIGNAL WAVEFORMS IN A CDMA CELLULAR TELEPHONE SYSTEM", issued Jun. 25, 1990, assigned to the assignee of the present invention, the disclosure of which is incorporated by this reference, provides a means for overcoming the adverse effects of multipath in the mobile unit-to-base station link by using noncoherent modulation and demodulation techniques.

In a CDMA cellular telephone system, the same frequency band can be used for communication in all base stations. At the base station receiver, separable multipath, such as a line of site path and another one reflecting off of a building, can be diversity combined for enhanced modem performance. The CDMA waveform properties that provide processing gain are also used to discriminate between signals that occupy the same frequency band. Furthermore the high speed pseudonoise (PN) modulation allows many different propagation paths of the same signal to be separated, provided the difference in path delays exceeds the PN chip duration. If a PN chip rate of approximately 1 MHz is employed in a CDMA system, the full spread spectrum processing gain, equal to the ratio of the spread bandwidth to the system data rate, can be employed against paths having delays that differ by more than one microsecond. A one microsecond path delay differential corresponds to differential path distance of approximately 300 meters. The urban environment typically provides differential path delays in excess of one microsecond.

The multipath properties of the terrestrial channel produce at the receiver signals having traveled several distinct propagation paths. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the mobile radio channel, the multipath is created by reflection of the signal from obstacles in the environment, such as buildings, trees, cars, and people. In general the mobile radio channel is a time varying multipath channel due to the relative motion of the structures that create the multipath. For example, if an ideal impulse is transmitted over the time varying multipath channel, the received stream of pulses would change in time location, attenuation, and phase as a function of the time that the ideal impulse was transmitted.

The multipath characteristic of a channel can result in signal fading. Fading is the result of the phasing characteristics of the multipath channel. A fade occurs when multipath vectors are added destructively, yielding a received signal that is smaller than either individual vector. For example if a sine wave is transmitted through a multipath channel having two paths where the first path has an attenuation factor of X dB, a time delay of $\delta$ with a phase shift of $\Theta$ radians, and the second path has an attenuation factor of X dB, a time delay of $\delta$ with a phase shift of $\Theta+\pi$ radians, no signal would be received at the output of the channel.

In narrow band modulation systems such as the analog FM modulation employed by conventional radio telephone systems, the existence of multiple paths in the radio channel results in severe multipath fading. As noted above with a wideband CDMA, however, the different paths may be discriminated in the demodulation process. This discrimination not only greatly reduces the severity of multipath fading but provides an advantage to the CDMA system.

Diversity is one approach for mitigating the deleterious effects of fading. It is therefore desirable that some form of diversity be provided which permits a system to reduce fading. Three major types of diversity exist: time diversity, frequency diversity, and space/path diversity.

Time diversity can best be obtained by the use of repetition, time interleaving, and error correction and detection coding which introduce redundancy. A system comprising the present invention may employ each of these techniques as a form of time diversity.

CDMA by its inherent wideband nature offers a form of frequency diversity by spreading the signal energy over a wide bandwidth. Therefore, frequency selective fading affects only a small part of the CDMA signal bandwidth.

Space and path diversity are obtained by providing multiple signal paths through simultaneous links from a mobile unit through two or more base stations and by employing two or more spaced apart antenna elements at a single base station. Furthermore, path diversity may be obtained by exploiting the multipath environment through spread spectrum processing by allowing a signal arriving with different propagation delays to be received and processed separately as discussed above. Examples of path diversity are illustrated in U.S. Pat. No. 5,101,501 entitled "SOFT HAND-OFF IN A CDMA CELLULAR TELEPHONE SYSTEM", issued Mar. 21, 1992 and U.S. Pat. No. 5,109,390 entitled "DIVERSITY RECEIVER IN A CDMA CELLULAR TELEPHONE SYSTEM", issued Apr. 28, 1992, both assigned to the assignee of the present invention.

The deleterious effects of fading can be further controlled to a certain extent in a CDMA system by controlling transmitter power. A system for base station and mobile unit power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM", issued Oct. 8, 1991, also assigned to the assignee of the present invention.

The CDMA techniques as disclosed in the '307 patent contemplate the use of relatively long PN sequences with each mobile unit user being assigned a different PN sequence. The cross-correlation between different PN sequences and the autocorrelation of a PN sequence, for all time shifts other than zero, both have a nearly zero average value which allows the different user signals to be discriminated upon reception. (Autocorrelation and cross-correlation requires logical "0" take on a value of "1" and logical "1" take on a value of "−1" or a similar mapping in order that a zero average value be obtained.)

However, such PN signals are not orthogonal. Although the cross-correlation essentially averages to zero over the entire sequence length, for a short time interval, such as an information bit time, the cross-correlation is a random variable with a binomial distribution. As such, the signals interfere with each other much the same as they would if they were wide bandwidth Gaussian noise at the same power spectral density. Thus the other user signals, or mutual interference noise, ultimately limits the achievable capacity.

It is well known in the art that a set of n orthogonal binary sequences, each of length n, for n any power of 2 can be constructed, see *Digital Communications with Space Applications*, S. W. Golomb et al., Prentice-Hall, Inc., 1964, pp. 45–64. In fact, orthogonal binary sequence sets are also known for most lengths which are multiples of four and less than two hundred. One class of such sequences that is easy to generate is called the Walsh function, also known as Hadamard matrices.

A Walsh function of order n can be defined recursively as follows:

$$W(n) = \begin{vmatrix} W(n/2), & W(n/2) \\ W(n/2), & W'(n/2) \end{vmatrix}$$

where W' denotes the logical complement of W, and $W(1) = |0|$.

Thus, $$W(2) = \begin{vmatrix} 0, 0 \\ 0, 1 \end{vmatrix},$$

$$W(4) = \begin{vmatrix} 0, 0, 0, 0 \\ 0, 1, 0, 1 \\ 0, 0, 1, 1 \\ 0, 1, 1, 0 \end{vmatrix}, \text{ and}$$

$$W(8) = \begin{vmatrix} 0, 0, 0, 0, 0, 0, 0, 0 \\ 0, 1, 0, 1, 0, 1, 0, 1 \\ 0, 0, 1, 1, 0, 0, 1, 1 \\ 0, 1, 1, 0, 0, 1, 1, 0 \\ 0, 0, 0, 0, 1, 1, 1, 1 \\ 0, 1, 0, 1, 1, 0, 1, 0 \\ 0, 0, 1, 1, 1, 1, 0, 0 \\ 0, 1, 1, 0, 1, 0, 0, 1 \end{vmatrix}.$$

A Walsh sequence or code is one of the rows of a Walsh function matrix. A Walsh function matrix of order n contains n sequences, each of length n Walsh chips. Each Walsh code has a corresponding Walsh index where the Walsh index refers to the number (1 through n) corresponding to the row in which a Walsh code is found. For example, for n=8 Walsh function matrix given above, the all zeroes row corresponds to Walsh index 1 and the Walsh code 0, 0, 0, 0, 1, 1, 1, 1 corresponds to Walsh index 5.

A Walsh function matrix of order n (as well as other orthogonal functions of length n) has the property that over the interval of n bits, the cross-correlation between all the different sequences within the set is zero. This can be seen by noting that every sequence differs from every other sequence in exactly half of its bits. It should also be noted that there is always one sequence containing all zeroes and that all the other sequences contain half ones and half zeroes. The Walsh symbol which consists all logical zeros instead of half one's and zero's is called the Walsh zero symbol.

On the reverse link channel from the mobile unit to the base station, no pilot signal exists to provide a phase reference. Therefore a method is needed to provide a high-quality link on a fading channel having a low Eb/No (energy per bit/noise power density). Walsh function modulation on the reverse link is a simple method of obtaining 64-ary modulation with coherence over the set of six code symbols mapped into the 64 Walsh codes. The characteristics of the terrestrial channel are such that the rate of change of phase is relatively slow. Therefore, by selecting a Walsh code duration which is short compared to the rate of change of phase on the channel, coherent demodulation over the length of one Walsh code is possible.

On the reverse link channel, the Walsh code is determined by the information being transmitted from the mobile unit. For example a three bit information symbol could be mapped into the eight sequences of W(8) given above. An "unmapping" of the Walsh encoded symbols into an estimate of the original information symbols may be accomplished in the receiver by a Fast Hadamard Transform (FHT). A preferred "unmapping" or selection process produces soft decision data which can be provided to a decoder for maximum likelihood decoding.

An FHT is used to perform the "unmapping" process. An FHT correlates the received sequence with each of the possible Walsh sequences. Selection circuitry is employed to select the most likely correlation value, which is scaled and provided as soft decision data.

A spread spectrum receiver of the diversity or "rake" receiver design comprises multiple data receivers to mitigate the effects of fading. Typically each data receiver is assigned to demodulate a signal which has traveled a different path, either through the use of multiple antennas or due to the multipath properties of the channel. In the demodulation of signals modulated according to an orthogonal signaling scheme, each data receiver correlates the received signal with each of the possible mapping values using an FHT. The FHT outputs of each data receiver are combined and selection circuitry then selects the most likely correlation value based on the largest combined FHT output to produce a demodulated soft decision symbol.

In the system described in the above-referenced '459 patent, the call signal begins as a 9600 bits per second information source which is then converted by a rate ⅓ forward error correction encoder to a 28,800 symbols per second output stream. These symbols are grouped 6 at a time to form 4800 Walsh symbols per second, each Walsh symbol selecting one of sixty-four orthogonal Walsh functions that are sixty-four Walsh chips in duration. The Walsh chips are modulated with a user-specific PN sequence generator. The user-specific PN modulated data is then split into two signals, one of which is modulated with an in-phase (I) channel PN sequence and one of which is modulated with a quadrature (Q) channel PN sequence. Both the I channel modulation and the Q channel modulation provide four PN chips per Walsh chip with a 1.2288 MHz PN spreading rate. The I and the Q modulated data are Offset Quadrature Phase Shift Keying (OQPSK) combined for transmission.

In the CDMA cellular system described in the above-referenced '307 patent, each base station provides coverage to a limited geographic area and links the mobile units in its coverage area through a cellular system switch to the public switched telephone network (PSTN). When a mobile unit moves to the coverage area of a new base station, the routing of that user's call is transferred to the new base station. The base station-to-mobile unit signal transmission path is referred to as the forward link and the mobile unit-to-base station signal transmission path is referred to as the reverse link.

As described above, the PN chip interval defines the minimum separation two paths must have in order to be combined. Before the distinct paths can be demodulated, the relative arrival times (or offsets) of the paths in the received signal must first be determined. The channel element modem performs this function by "searching" through a sequence of potential path offsets and measuring the energy received at each potential path offset. If the energy associated with a potential offset exceeds a certain threshold, a signal demodulation element may be assigned to that offset. The signal present at that path offset can then be summed with the contributions of other demodulation elements at their respective offsets. A method and apparatus of demodulation element assignment based on searcher demodulation element energy levels is disclosed in U.S. Pat. No. 5,490,165, issued Feb. 6, 1996 entitled "DEMODULATION ELEMENT ASSIGNMENT IN A SYSTEM CAPABLE OF RECEIVING MULTIPLE SIGNALS," assigned to the assignee of the present invention. Such a diversity or rake receiver provides for a robust digital link, because all paths have to fade together before the combined signal is degraded.

FIG. 1 shows an exemplary set of signals from a single mobile unit arriving at the base station. The vertical axis represents the power received on a decibel (dB) scale. The horizontal axis represents the delay in the arrival time of a signal due to multipath delays. The axis (not shown) going into the page represents a segment of time. Each signal spike in the common plane of the page has arrived at a common time but was transmitted by the mobile unit at a different time. In a common plane, peaks to the right were transmitted at an earlier time by the mobile unit than peaks to the left. For example the left-most peak spike 2 corresponds to the most recently transmitted signal. Each signal spike 2–7 has traveled a different path and therefore exhibits a different time delay and a different amplitude response. The six different signal spikes represented by spikes 2–7 are representative of a severe multipath environment. Typical urban environments produce fewer usable paths. The noise floor of the system is represented by the peaks and dips having lower energy levels. The task of a searcher element is to identify the delay as measured by the horizontal axis of signal spikes 2–7 for potential demodulation element assignment. The task of the demodulation element is to demodulate a set of the multipath peaks for combination into a single output. It is also the task of the demodulation elements once assigned to a multipath peak to track that peak as it may move in time.

The horizontal axis can also be thought of as having units of PN offset. At any given time, the base station receives a variety of signals from a single mobile unit, each of which has traveled a different path and may have a different delay than the others. The mobile unit's signal is modulated by a PN sequence. A copy of the PN sequence is also generated at the base station. At the base station, each multipath signal is individually demodulated with a PN sequence code aligned to its timing. The horizontal axis coordinates can be thought of as corresponding to the PN sequence code offset which would be used to demodulate a signal at that coordinate.

Note that each of the multipath peaks varies in amplitude as a function of time as shown by the uneven ridge of each multipath peak. In the limited time shown, there are no major changes in the multipath peaks. Over a more extended time range, multipath peaks disappear and new paths are created as time progresses. The peaks can also slide to earlier or later offsets as the path distances change as the mobile unit moves around in the coverage area of the base station. Each demodulation element tracks these small variations in the signal assigned to it.

In a typical wireless telephone communication system, the mobile unit transmitter may employ a vocoding system which encodes voice information in a variable rate format. For example, the data rate may be lowered due to pauses in the voice activity. The lower data rate reduces the level of interference to other users caused by the mobile unit transmissions. At the receiver, or otherwise associated with the receiver, a vocoding system is employed for reconstructing the voice information. In addition to voice information, non-voice information alone or a mixture of the two may be transmitted by the mobile unit.

A vocoder which is suited for application in this environment is described in U.S. Pat. No. 5,414,796, issued May 9, 1995, which is a continuation of U.S. Pat. application Ser. No. 07/713,661 now abandoned, entitled "VARIABLE RATE VOCODER," and assigned to the assignee of the present invention. This vocoder produces from digital samples of the voice information encoded data at four different rates, e.g. approximately 8,000 bits per second (bps), 4,000 bps, 2,000 bps and 1,000 bps, based on voice activity during a 20 millisecond (ms) frame. Each frame of vocoder data is formatted with overhead bits as 9,600 bps, 4,800 bps, 2,400 bps, and 1,200 bps data frames. The highest rate data frame which corresponds to a 9,600 bps frame is referred to as a "full rate" frame; a 4,800 bps data frame is referred to as a "half rate" frame; a 2,400 bps data frame is referred to as a "quarter rate" frame; and a 1,200 bps data frame is referred to as an "eighth rate" frame. In neither the encoding process nor the frame formatting process is rate information included in the data. When the mobile unit transmits data at less than full rate, the duty cycle of the mobile units transmitted signal is the same as the data rate. For example, at quarter rate a signal is transmitted from the mobile unit only one quarter of the time. During the other three quarters time, no signal is transmitted from the mobile unit. The mobile unit includes a data burst randomizer. Given the data rate of the signal to be transmitted, the data burst randomizer determines during which time slots the mobile unit transmits and during which time slots it does not. Further details on the data burst randomizer are described in copending U.S. patent application Ser. No. 08/194,823 filed Feb. 14, 1994, which is a continuation of U.S. patent application Ser. No. 07/846,312, now abandoned, entitled "DATA BURST RANDOMIZER," filed and assigned to the assignee of the present invention.

At the base station, each individual mobile unit signal must be identified from the ensemble of call signals received to be demodulated back into the original call signal of the mobile unit. A system and method for demodulating a mobile unit signal received at a base station is described, for example, in the '459 patent. FIG. 2 is a block diagram of the base station equipment described in the '459 patent for demodulating a reverse link mobile unit signal.

A typical prior art base station comprises multiple independent searcher and demodulation elements. The searcher and demodulation elements are controlled by a microprocessor. In this exemplary embodiment, to maintain a high system capacity, each mobile unit in the system does not transmit a pilot signal. The lack of a pilot signal on the reverse link increases the time needed to conduct a survey of all possible time offsets at which a mobile unit signal may be received. Typically a pilot signal is transmitted at a higher power than the traffic bearing signals thus increasing the signal to noise ratio of the received pilot as compared to the received traffic channel signals. In contrast, ideally each mobile trait transmits a reverse link signal which arrives with a signal level equal to the power level received from every other mobile unit therefore having a low signal to noise ratio. Also, a pilot channel transmits a known sequence of data. Without the pilot signal, the searching process must examine all possibilities of what data may have been transmitted.

FIG. 2 shows an exemplary embodiment of a prior art base station. The base station of FIG. 2 has one or more antennas 12 receiving CDMA reverse link mobile unit signals 14. Typically, an urban base station's coverage area is split into three sub-regions called sectors. With two antennas per sector, a typical base station has a total of six receive antennas. The received signals are down-converted to baseband by an analog receiver 16 that quantizes the received signal I and Q channels and sends these digital values over signal lines 18 to channel element modem 20. A typical base station comprises multiple channel element modem like channel element modem 20 (not shown in FIG. 2). Each channel element modem 20 supports a single user. In the preferred embodiment, channel element modem 20 comprises four demodulation elements 22 and eight searchers 26. Microprocessor 34 controls the operation of demodulation elements 22 and searchers 26. The user PN code in each demodulation element 22 and searcher 26 is set to that of the mobile unit assigned to that channel element modem 20. Microprocessor 34 steps searchers 26 through a set of offsets, called a search window, that is likely to contain multipath signal peaks suitable for assignment of demodulation elements 22. For each offset, searcher 26 reports the energy it finds at that offset to microprocessor 34. Demodulation elements 22 are then assigned by microprocessor 34 to the paths identified by searcher 26. Once one of demodulation elements 22 has locked onto the signal at its assigned offset, it then tracks that path on its own without supervision from microprocessor 34, until the path fades away or until it is assigned to a new path by microprocessor 34.

Each of demodulation elements 22 is highly similar in structure to the others. FIG. 3 illustrates in further detail demodulation element 22 of FIG. 2. In FIG. 3, the digitized input signal is assumed to be a Quadrature Phase Shift Keyed (QPSK) signal having in-phase (I) and quadrature-phase (Q) signal samples. The I and Q signal samples, each being a multiple-bit value, are input to decimator and despreader 46. Typically the I and Q signal samples are over-sampled in that the input is received at a data rate higher than the chip rate. In decimator and despreader 46, the data is decimated from the over-sampled data rate to the PN chip rate. The data is then despread by decimator and despreader 46 using the same PN sequence used to modulate this signal in the mobile unit.

Decimator and despreader 46 outputs despread I and Q signal components to the accumulator 48. Accumulator 48 accumulates the despread I and Q signal components over a Walsh Chip period to produce accumulated I and Q chip data. The accumulated I and Q chip data is then processed by the Fast Hadamard Transformer (FHT) and selector 52. The FHT portion of FHT and selector 52 correlates the accumulated I and Q chip data with all possible Walsh sequences. Each I and Q correlation result is then used to estimate the magnitude of the corresponding Walsh symbol. The magnitude estimates from each of the I and Q correlation results are compared with each other. The Walsh symbol corresponding to the I and Q correlation result that has the biggest magnitude is selected by the selector portion of FHT and selector 52 as the demodulated Walsh symbol. The demodulated Walsh symbol is output along with the corresponding estimated magnitude of that Walsh symbol.

Due to the different arrival times of signal paths assigned to the different demodulation elements, demodulation element 22 also performs a de-skewing of the symbols. The output to combiner 28 (FIG. 2) must be delayed by deskew buffer 54 such that each demodulation element 22 provides data synchronized in relation to the other demodulation elements.

Energy accumulator and lock detector 44 sums a series of consecutive Walsh symbol magnitudes. The resulting sum is output to microprocessor 34 (FIG. 2). The resulting sum is also compared with a threshold to indicate a locked or unlocked state by energy accumulator and lock detector 44.

The arrival time of the signal path assigned to demodulation element 22 may change over time because of movement of the mobile unit or change in the mobile unit's surroundings. Therefore demodulation element 22 incorporates time tracking circuitry. Decimator and despreader 46 outputs an early and a late version of despread I and Q signal components to be used in the time tracking process. Accumulator 50 accumulates the early and the late, despread I and Q signal components over a Walsh chip period to produce accumulated early and late, I and Q chip data. Delay 40 delays the output of accumulator 50 until the results of FHT and selector 52 are available. Note that delay 40 must store large blocks of data and requires a large die area in an integrated circuit chip implementation. Early and late metric generation 38 then multiplies the accumulated early and late, I and Q chip data by the Walsh sequence corresponding to the demodulated Walsh symbol and accumulates the result to find the magnitude of early and late, I and Q Walsh symbols. The early symbol magnitude is subtracted from the late symbol magnitude to produce an error metric. The error metric is output to time tracking 36. Time tracking 36 uses the error metric to determine if the despreading operation in decimator and despreader 46 is running ahead, behind, or on time. Microprocessor 34 keeps track of absolute demodulation path time of the demodulation element 22.

Referring again to FIG. 2, the output of FHT and selector 52 for each demodulation element 22 is then combined with those of other demodulation elements by combiner 28. The output of combiner 28 is a "soft decision" demodulated symbol, weighted by the confidence that it correctly identifies the originally transmitted Walsh symbol. The soft decision is then passed to forward error correction decoder 29 for further processing to recover the original call signal. This call signal is then sent through digital link 30, such as a T1 or E1 link, that routes the call to public switched telephone network (PSTN) 32.

Like each demodulation element 22, each searcher 26 contains a demodulation data path with an FHT processor capable of performing one FHT transform during a time period equal to the period of a Walsh symbol. The FHT processor is slaved to "real time" in the sense that during every Walsh chip interval one value is input to the FHT and one value is output from the FHT. To provide a rapid searching process, more than one searcher element must be used. Searcher elements 26 continually scan in search of a particular mobile unit's information signal as controlled by microprocessor 34. For each offset processed, each searcher 26 finds the correlation energy at that offset by despreading the antenna samples, accumulating them into Walsh chips that are input to the FHT transform, performing the FHT transform and summing the maximum FHT output energy for each of the Walsh symbols for which the searcher dwells at an offset. The final sum is reported back to microprocessor 34.

The multipath environment is constantly changing as the mobile unit and other reflective objects move about in the base station coverage area. The number of demodulation elements required is a function of the number of paths generally found to be usable at any point in time. To meet these needs, the FIG. 2 system has two searchers 26 and one demodulation element 24 for each of four demodulator integrated circuits (IC's) used, for a total of four demodulation elements and eight searchers per channel element modem. Each of these twelve processing elements contains a complete demodulation data path, including the FHT processor which takes a relatively large, costly amount of area to implement on an integrated circuit. In addition to the four demodulator IC's the channel element modem also has a modulator IC and a forward error correction decoder IC for a total of 6 IC chips. A powerful and expensive microprocessor is needed to manage and coordinate the demodulation elements and the searchers. As implemented in the modem of FIG. 2, these circuits were completely independent and require the close guidance of microprocessor 34 to sequence through the correct offsets, and handle the FHT outputs. Every Walsh symbol microprocessor 34 receives an interrupt to process the FHT outputs. This interrupt rate alone necessitates a high powered microprocessor.

It would be advantageous if the six IC's required for a modem could be reduced to a single IC needing less microprocessor support, thereby reducing the direct IC cost and board-level production cost of the modem, and allowing migration to a lower cost microprocessor (or alternately a single high powered microprocessor supporting several channel element modems at once). Just relying on shrinking feature sizes of the IC fabrication process and placing the six chips together on a single die is not enough. The fundamental architecture of the demodulator needs to be redesigned for a truly cost effective single chip modem. From the discussion above, it should be apparent that there is a need for a signal receiving and processing apparatus that can demodulate a spread spectrum call signal in a lower cost and more architecturally efficient manner.

SUMMARY OF THE INVENTION

A pipelined demodulation technique for demodulation of multipath spread spectrum communication signals uses a single, integrated demodulation processor servicing a plurality of demodulation element front end blocks. Time sliced operation allows a single series of processing blocks within the demodulation processor to be used to process a plurality of path diverse signals which are ultimately combined to produce a single output signal. Signals from the parallel set of demodulation element front end blocks are processed through the pipelined, integrated demodulation processor blocks such that each block performs the analogous operation on signals originating from every one of the demodulation element front end blocks on successive time slices.

Each demodulation element front end block despreads a different multipath portion of incoming spread spectrum communication signal with a time aligned, pseudo-noise (PN) sequence. The output of each demodulation element front end block is output into a storage buffer each time a Walsh chip worth of data has been despread. The storage buffer stores the Walsh chips from each of the demodulation element front end blocks until a Walsh symbol's worth of chips are accumulated. A queuing arbiter governs transfer of the complete Walsh symbols to a single, shared transform engine which produces a decoded output which begins the pipelined, time slice operation of the demodulation process.

During a first time slice, a Walsh symbol worth of data is decoded by the shared transform engine. During a second time slice, the decoded output of the transform engine is processed by a maximum detection block and a combiner and the transform engine is available to process any other complete Walsh symbol that is available. The combiner stores the transformed outputs for subsequent summation with transformed outputs corresponding to the other demodulation element front end blocks. The maximum detection block detects the energy of the largest transform output and the index corresponding to that output.

During a third time slice, the maximum energy output of the maximum detection block is processed by a lock detection block and the index corresponding to the maximum energy is used by a time tracking block. The lock detection block accumulates and filters the maximum energy output. The time tracking block uncovers an early and a late Walsh symbol from the corresponding demodulation element front end block using the index corresponding to the maximum energy and compares the early result to the late result. In keeping with the time sliced operation, during the third time slice, the transform engine is available to process any other complete Walsh symbol that is available and the maximum detection block and a combiner are available to process any available output of the transform engine.

During a fourth time slice, the time tracking block performs a second time tracking operation of filtering and accumulating the output of the comparison. During the fourth time slice, the previous blocks continue to be available to process subsequent demodulation element front end block outputs in the pipelined fashion.

During a series of subsequent time slices, each demodulation element front end block currently assigned to a valid multipath signal provides an output signal which cascades through the pipelined process. When each demodulation element front end block output corresponding to a single transmitted Walsh symbol has been processed by the transformer, the summed output is first-pass-processed by a dual maxima metric block. During the next time slice, the output of the first pass of the dual maxima metric block is passed to the power control decision block and the dual maxima metric completes a second pass to produce soft decision data.

DESCRIPTION OF THE PREFERRED EMBODIMENT

Figure 4:
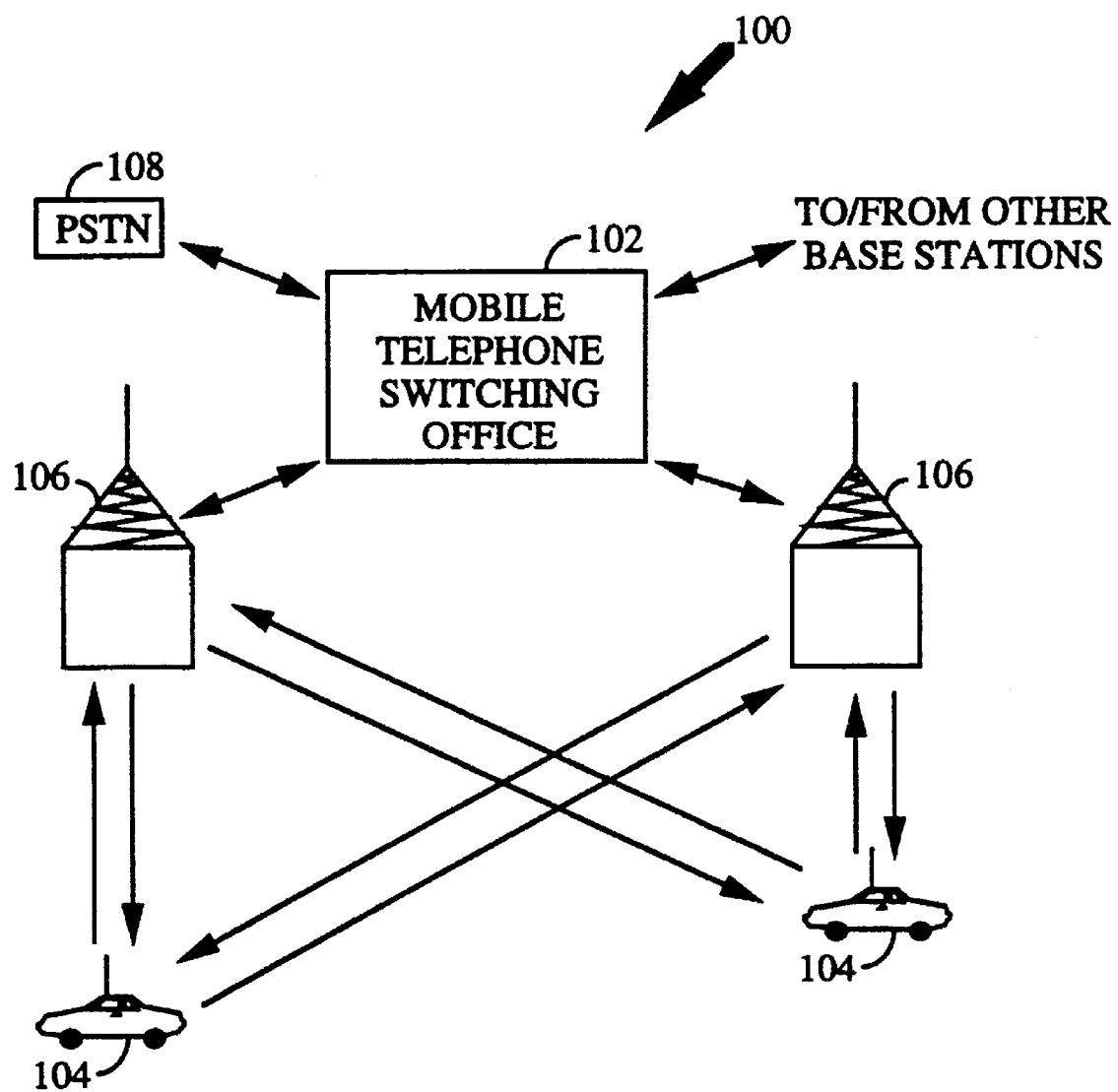
FIG. 4 represents an exemplary CDMA telecommunications system constructed in accordance with the present invention.

The present invention can be implemented in a wide variety of data transmission applications and in the preferred embodiment illustrated in FIG. 4 is implemented within system 100 for voice and data transmission in which a system controller and switch, referred to as mobile telephone switching office (MTSO) 102, performs interface and control functions to permit call communications with mobile units 104 through base stations 106. MTSO 102 controls the routing of calls between public switched telephone network (PSTN) 108 and base stations 106 for transmission to and from mobile units 104.

Figure 5:
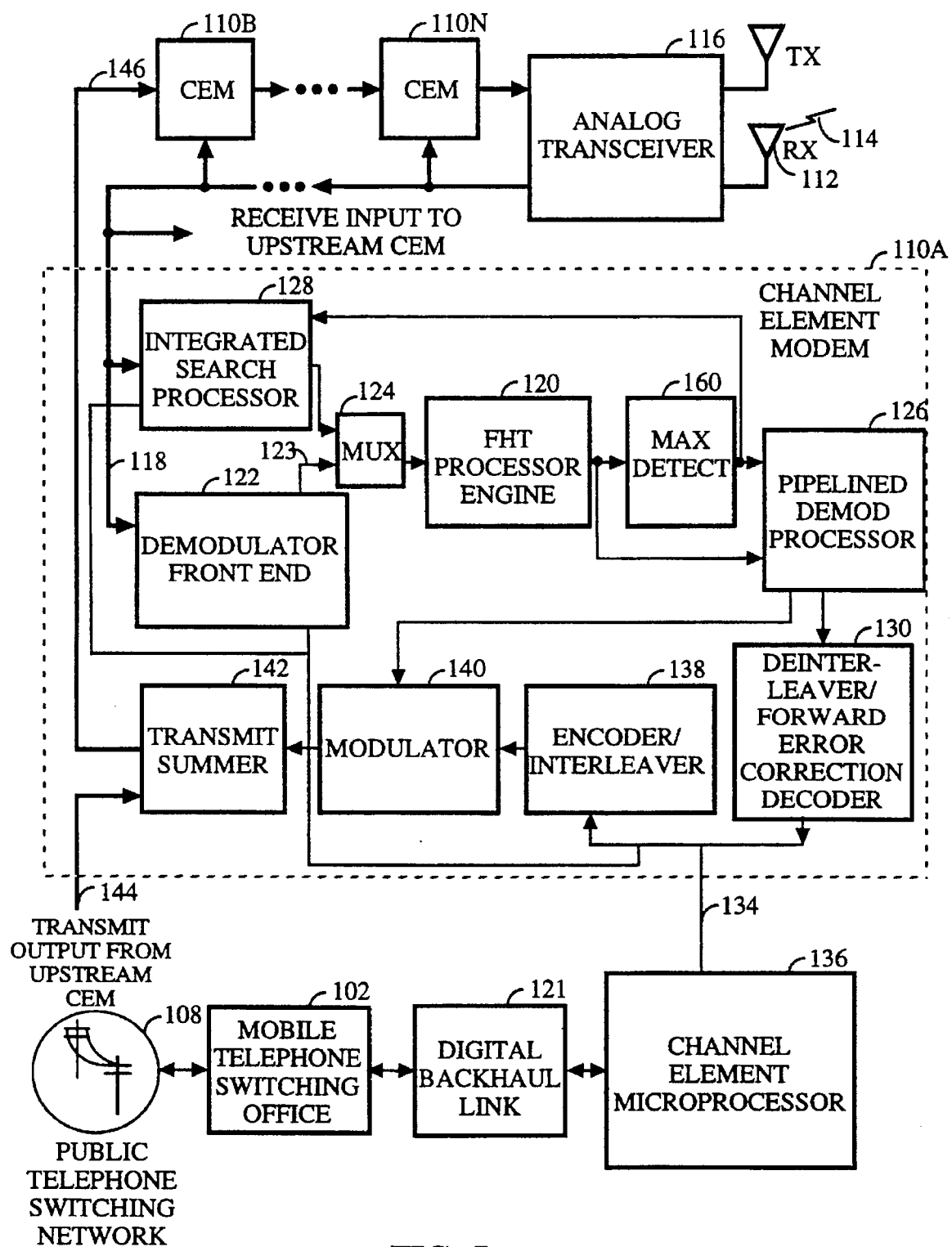
FIG. 5 is a block diagram of a channel element modem constructed in accordance with the present invention.

FIG. 5 illustrates channel element modems 110A–110N and other elements of the base station infrastructure operating in accordance with the CDMA methods and data formats described in the above-referenced patents. A plurality of antennas 112 provides a received reverse link signal 114 to an analog transmitter-receiver transceiver 116. Transceiver 116 down-converts the signal to baseband and samples the waveform at eight times the PN chip rate of the CDMA received signal as defined above. Transceiver 116 provides the digital antenna samples to channel element modems 110A–110N through base station RX backplane signal 118. Each channel element modems 110A–110N is assigned to one of mobile units 104 of FIG. 4 when active communication is establish with the base station. Each channel element modems 110A–110N are nearly identical in structure.

When channel element modem 110A is assigned to an active call, demodulator front end 122 and integrated search processor 128 isolate a signal from a particular call from the plurality of call signals contained in reverse link signal 114 by use of the PN sequences as described in the above referenced patents and patent applications. Channel element modem 110A includes single, integrated search processor 128 to identify multipath signals that can be used by demodulator front end 122. In the preferred embodiment, time sliced FHT processor engine 120 services both integrated search processor 128 and demodulator front end 122. Other than sharing FHT processor engine 120 and related max detect block 160, integrated search processor 128, is stand-alone, self-controlled, and self-contained. The searching process is detailed in a copending U.S. patent application Ser. No. 08/316,177 entitled "MULTIPATH SEARCH PROCESSOR FOR A SPREAD SPECTRUM MULTIPLE ACCESS COMMUNICATION SYSTEM" filed Sep. 30, 1994, and assigned to the assignee of the present application.

FHT processor engine 120 is the core of the demodulation process. In the preferred embodiment, FHT processor engine 120 correlates the received sequences of 64 Walsh chip values with each of the possible Walsh symbols that may have been transmitted by the mobile unit. FHT processor engine 120 outputs a correlation energy corresponding to each possible Walsh index where a higher correlation energy level corresponds to a higher likelihood that the symbol corresponding to that Walsh index was communicated by the mobile unit. Max detect block 160 then determines the largest of the 64 FHT transform energy outputs. The maximum correlation energy and the corresponding Walsh index from max detect block 160, and each of the 64 correlation energy are output from FHT processor engine 120 are passed to pipelined demodulator processor 126 for further signal processing as detailed below.

The soft decision symbol stream from pipelined demodulator processor 126 is output to deinterleaver/forward error correction decoder 130 where it is deinterleaved and decoded. Channel element microprocessor 136 supervises the entire demodulation procedure and obtains the recovered data from deinterleaver/forward error correction decoder 130 via microprocessor bus interface 134. The data is then routed through digital backhaul link 121 to MTSO 102 which connects the call through PSTN 108.

The forward link data path proceeds much as the inverse of the functions just presented for the reverse link. The signal is provided from PSTN 108 through MTSO 102 and to digital backhaul 121. Digital backhaul 121 provides input to encoder/interleaver 138 through channel element microprocessor 136. After encoding and interleaving the data, encoder/interleaver 138 passes the data to modulator 140 where it is modulated as disclosed in the above referenced patents. The output of modulator 140 is passed to transmit summer 142 where it is added to the outputs of other channel element modems prior to being up-converted from baseband and amplified in analog transmitter receiver 116. A summing method is disclosed in a co-pending U.S. patent application Ser. No. 08/316,156 entitled "SERIAL LINKED INTERCONNECT FOR THE SUMMATION OF MULTIPLE DIGITAL WAVEFORMS," filed Sep. 30, 1994, and assigned to the assignee of the present invention. As presented in the above referenced patent application, the transmit summer corresponding to each channel element modems 110A–110N can be cascaded in a daisy-chain fashion eventually resulting in a final sum that is provided to transceiver 116 for broadcasting.

Figure 6:
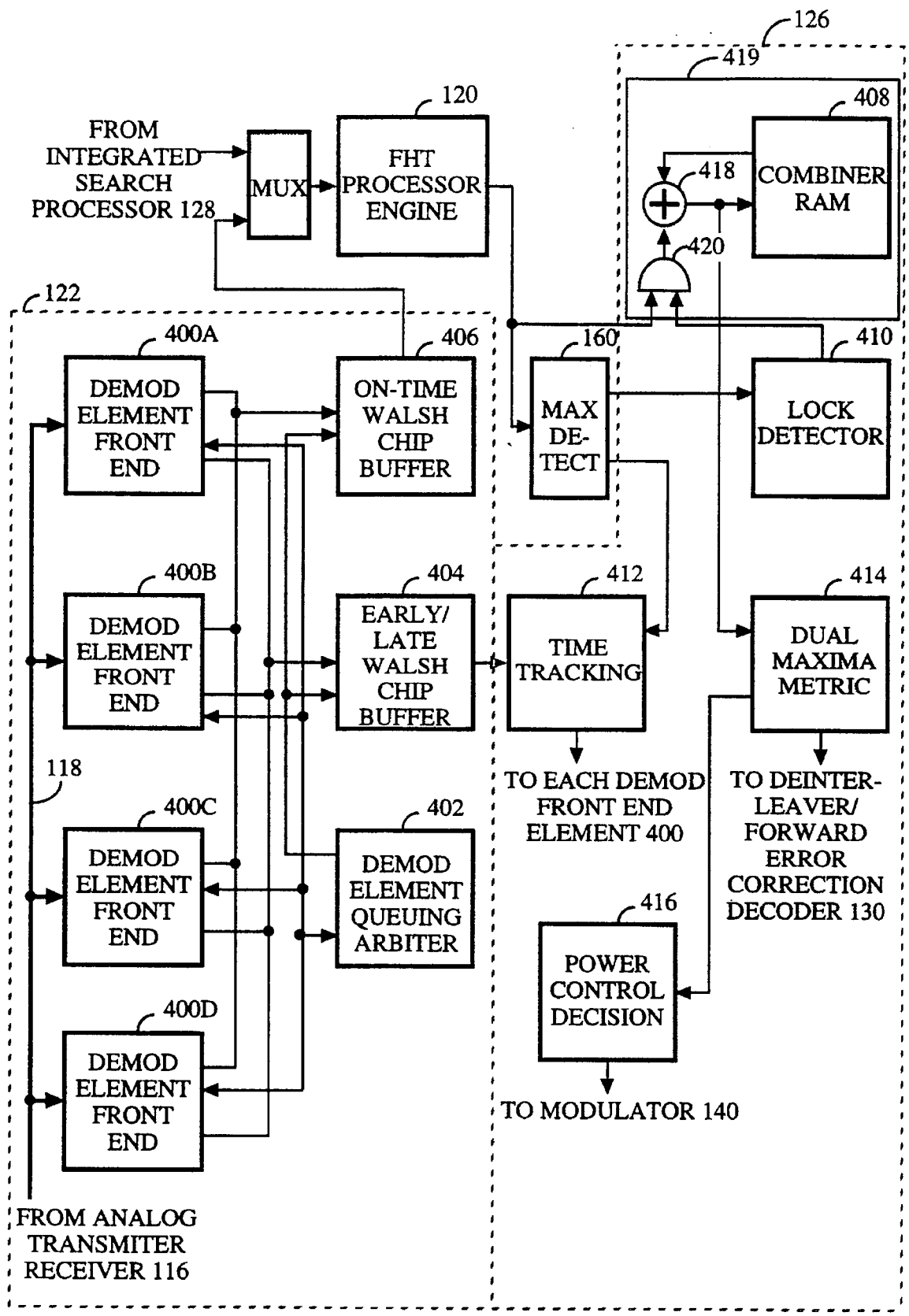
FIG. 6 is an overview of the demodulation rake receiver constructed in accordance with the present invention, including block diagrams of the demodulator front end and pipelined demodulator processor.

As shown in FIG. 5, the demodulator architecture of channel element modem 110 consists of two major segments, demodulator front end 122 and pipelined demodulator processor 126, linked together through FHT processor engine 120 and max detect block 160. FIG. 6 shows a more detailed diagram of the demodulator architecture. The division of labor between the two segments is determined by the frequency at which particular operations occur. Functions occurring once per PN chip such as despreading and Walsh chip accumulation are placed in demodulation element front ends 400A–400D. (The preferred embodiment is illustrated using four demodulation element front ends although generally any number could be used.) Operations performed once per Walsh symbol, such as lock detection, time tracking, combining, and decoding, are performed in pipelined demodulator processor 126.

Figure 1:
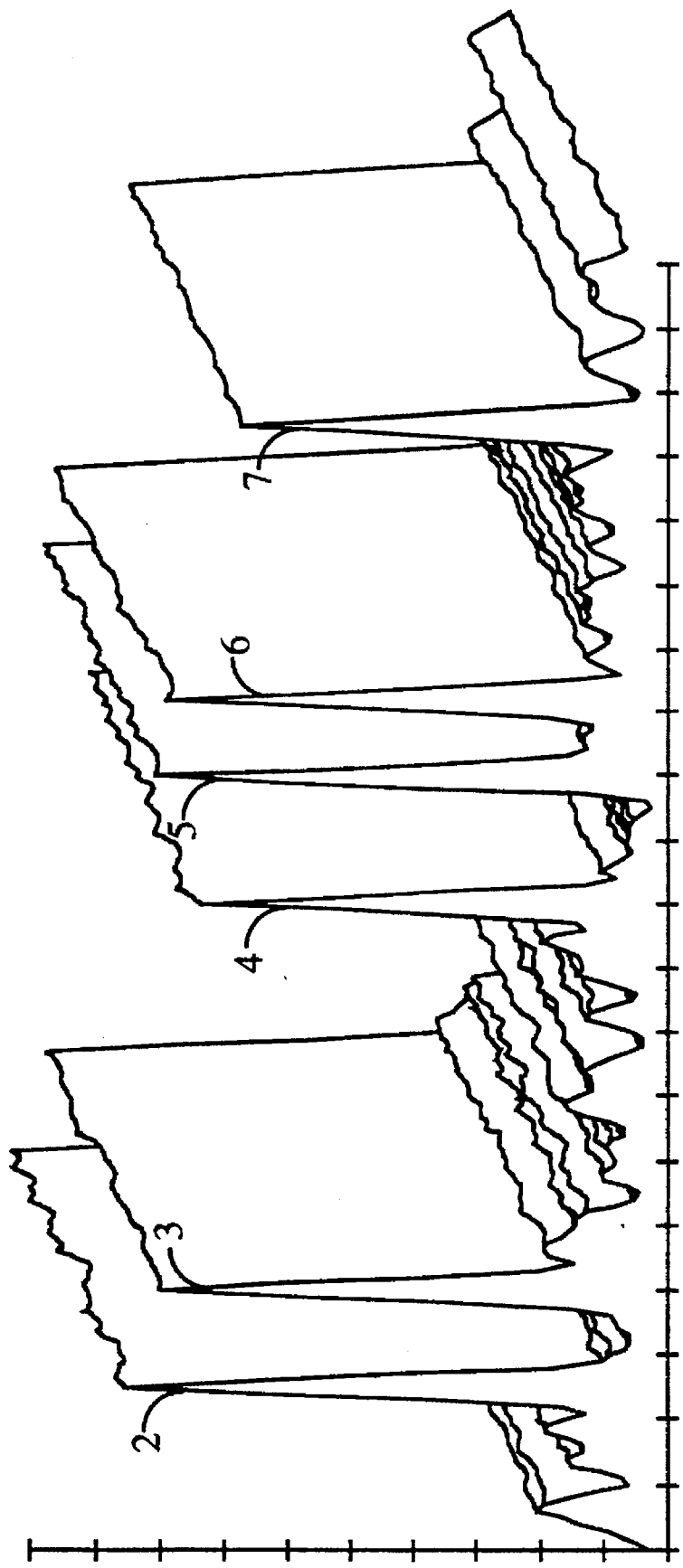
FIG. 1 represents an exemplary severe multipath signal condition.
Figure 2:
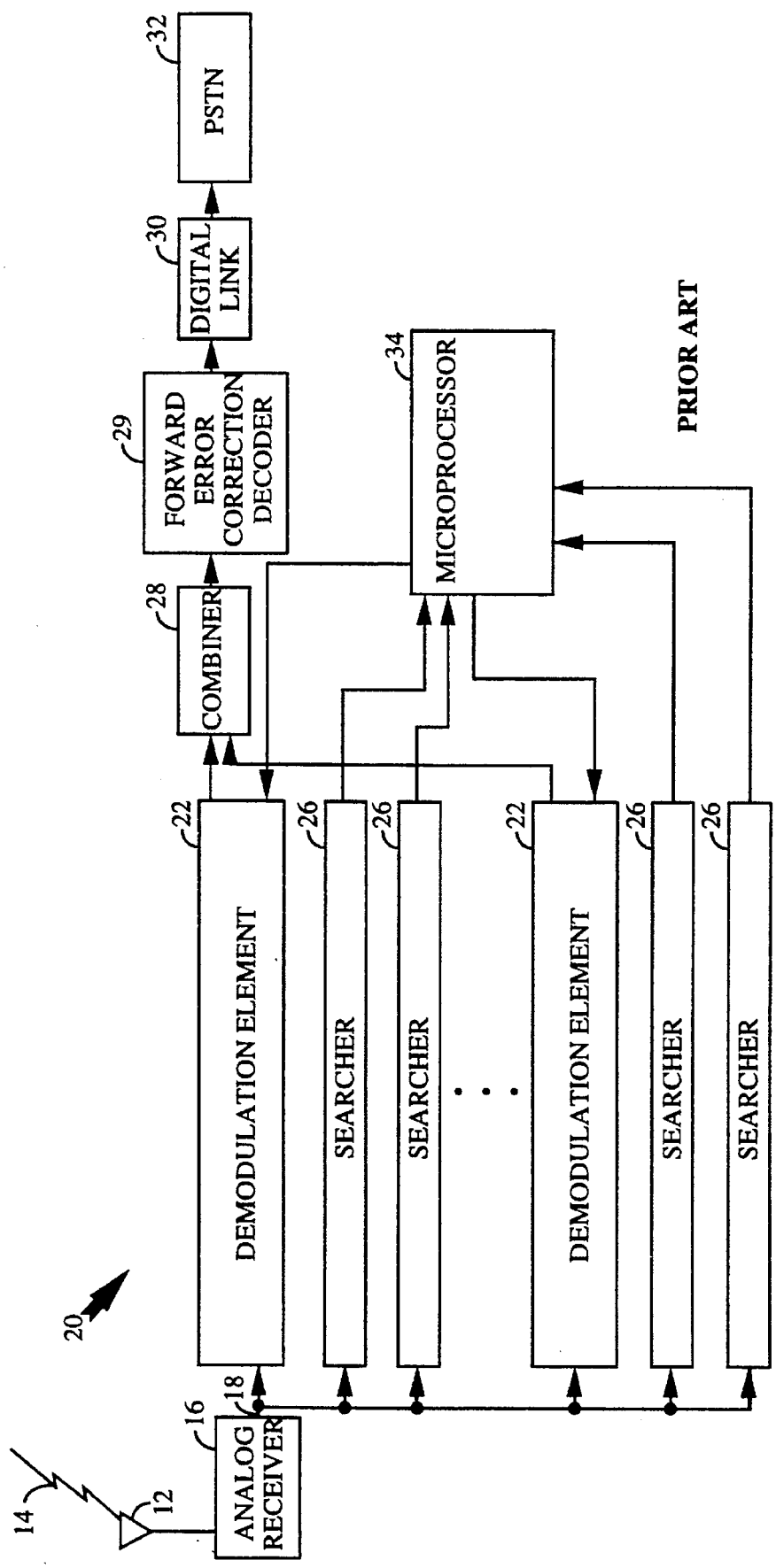
FIG. 2 is a block diagram of a prior art communications network demodulation system.

FHT processor engine 120, max detect 160, and each block in the pipelined demodulator processor 126 divide processing operations into discrete "time slices." In the preferred embodiment, a time slice is 64 clock cycles long, which is the number of cycles required by FHT processor engine 120 to perform a transform on 64 input Walsh chip values. Using a system clock that is eight times the PN chip rate, 64 clocks is equal to two Walsh chips or 1/32 of a Walsh symbol. Therefore 32 transforms can be performed in the time in which one Walsh symbol's worth of data is received. Due to the high rate of operation, FHT processor engine 120 may be shared on a time slice basis between demodulation and searching processes and replaces all of the prior art FHT processors 52 of FIGS. 2 and 3. Nominally, demodulator front end 122 outputs a complete stored Walsh symbol to FHT processor engine 120 one time slice per Walsh symbol for each demodulation element front end 400 which is demodulating a valid signal. The remaining time slices may be used by integrated search processor 128, allowing search results to be processed up to three times faster than the set of eight prior art searchers 26 of FIGS. 2 and 3. In alternative embodiments, the remaining time slices may be used to increase the number of demodulation element front ends. Further performance improvements are obtainable by increasing the clock speed of FHT processor engine 120.

In the exemplary embodiment, demodulator front end 122 includes four identical demod element front ends 400A–400D. Demodulation elements front end 400A–400D work in "real-time" like the prior art elements of FIG. 2, in the sense that each antenna sample is operated on immediately as it arrives. All of the signal processing operations shown in FIG. 3 which do not warrant operation in real time have been delegated to pipelined demodulator processor 126, FHT processor engine 120, and max detect block 160. Each demodulation element front end 400 performs the remaining functions, namely decimation, despreading, and Walsh chip accumulation. In order to implement these functions, a plurality of small adders and MUX's are required.

Pipelined demodulator processor 126 has been decoupled from real time by on-time Walsh chip buffer 406 and early/late Walsh chip buffer 404. After one of demod element front ends 400A–400D has provided an entire Walsh symbol's worth of data in on-time Walsh chip buffer 406 and early/late Walsh chip buffer 404, the Walsh symbol is output to FHT processor engine 120 on the next available time slice. If a conflict arises between two or more of the stored Walsh symbols wanting to use the FHT processor engine 120 at the same time, demod element queuing arbiter 402 sequences them on a first-come, first-serve basis on successive time slices, in the preferred embodiment.

Figure 7:
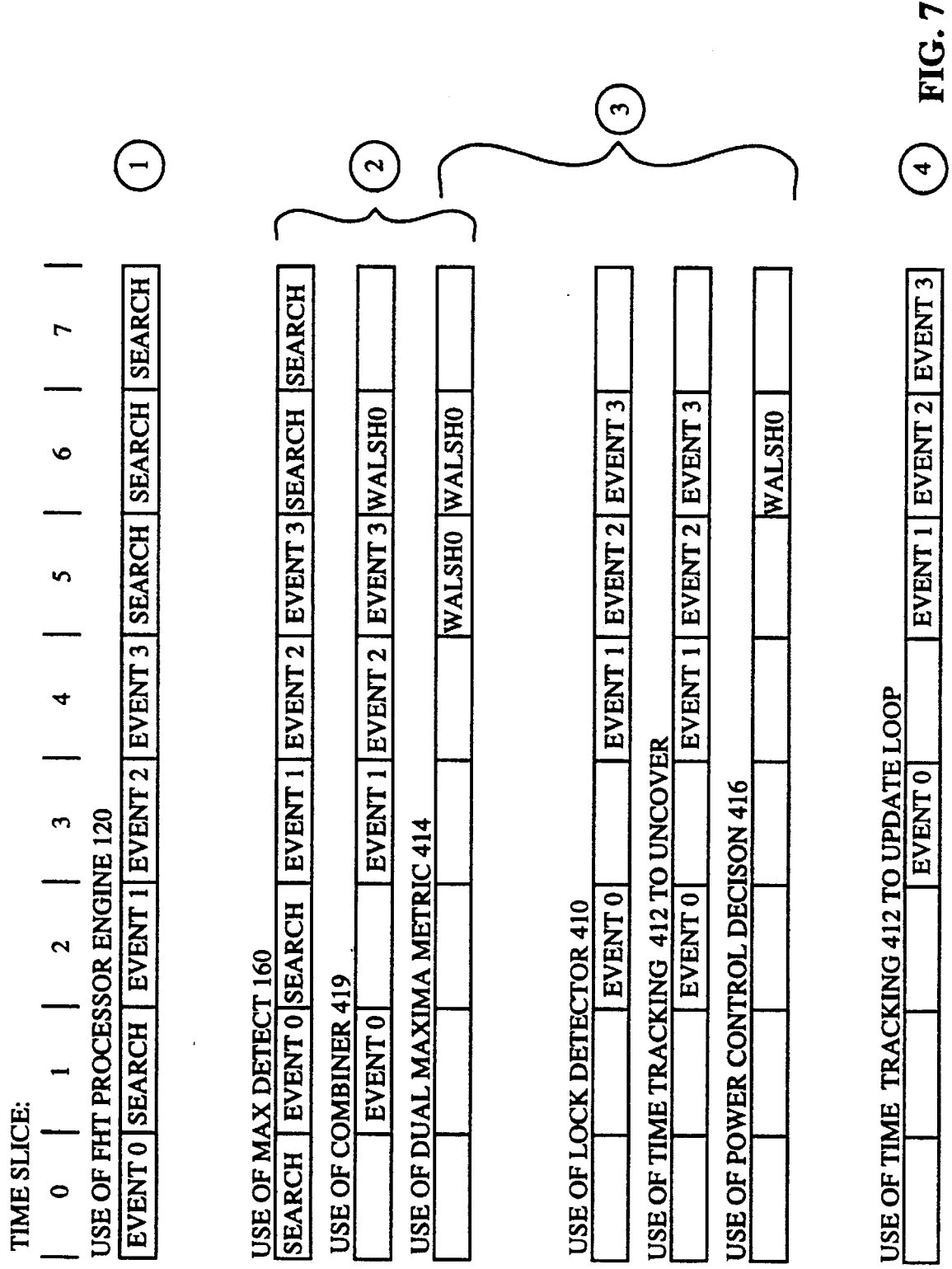
FIG. 7 is a timing diagram showing a typical pipelined demodulator processor allocation on a series of time slices.

Once a complete Walsh symbol has been output to FHT processor engine 120, a series of signal processing operations occurs in lock-step on successive time slices. Each block in pipelined demodulator processor 126 performs the same type of operation regardless of which of demodulation element front ends 400 the Walsh symbol originated from. This series of signal processing operations is called a "pipelined demodulation event." FIG. 7 shows the resource allocation in each time slice for the various processing blocks comprising pipelined demodulator processor 126 for a typical multipath environment in which each of demod element front ends 400A–400D have been assigned to different multipath signals. The labels, Events 0–3, on the time lines in FIG. 7 refer to the pipelined demodulation events for a first transmitted symbol, Walsh 0. The first Walsh symbol output from on-time Walsh chip buffer 406 corresponding to the Walsh 0 symbol is referred to as Event 0 and corresponds to data from whichever one of demod element front ends 400A–400D is receiving the earliest arriving multipath signal. Events 1, 2, and 3 correspond to data from the remaining three demodulation element front ends 400 where Event 3 represents the last available symbol corresponding to the Walsh 0 symbol.

A blank space in the use allocation bars of FIG. 7 indicates that the corresponding resource is not used during the corresponding time slice. The sharing of FHT processor engine 120 between the pipelined demodulation events and the search process can be seen in the resource allocation FHT processor engine 120 and max detect block 160. Search processing "fills in" the gaps in the usage pattern between the pipelined demodulation events. For the exemplary usage pattern of FIG. 7, the first pipelined demodulation event, Event 0, tracks a multipath arriving at least two Walsh chips from the other three elements, resulting in the gap in the usage pattern between Event 0 and Event 1 such that FHT processor engine 120 may be used by the search process during time slice 1 as indicated by the Search label in the usage allocation in FIG. 7.

The encircled numbers on the right-hand side of FIG. 7 indicate the relative time slice usage of the processing blocks with relation to the time slice during which a Walsh symbol's worth of data is output to FHT processor engine 120. For example, in the preferred embodiment, only FHT processor engine 120 is used during the first time slice. During the following time slice, max detect block 160, combiner 419, and, when processing the last event corresponding to the present symbol, dual maxima metric 414 are used. During the third time slice, lock detector 410, time tracking block 412, and, when processing the last event corresponding to the present symbol, dual maxima metric 414 and power control decision 416 are used. During the fourth time slice, time tracking block 412 is used once again.

The time slice usage pattern depends on the spacing between multipath offsets of the signals being processed by demodulation element front ends 400A–400D and the resulting time relation of the Walsh symbol boundaries associated with the assigned offsets to time slice processing intervals. Many different multipath environments can produce the same exemplary usage pattern of FIG. 7. For example, if the last three pipelined demodulation events correspond to nearly identical offsets, demodulation element queuing arbiter 402 would sequence one event per time slice resulting in the same usage pattern of FIG. 7. The same resulting usage pattern that would occur if the corresponding offsets of the last three events were spaced up to two Walsh chips (one time slice) apart.

During time slice 0, the symbol corresponding to Event 0 for the Walsh 0 symbol is input into FHT processor engine 120. In the preferred embodiment during time slice 0, 64 Walsh chips are read from on-time Walsh chip buffer 406 and input to FHT processor engine 120. During time slice 1, FHT processor engine 120 serially outputs each of the 64 correlation energies to max detect block 160 and to combiner 419. During time slice 2, time tracking block 412 uncovers (i.e. despreads) and accumulates early and late Walsh chips from early/late Walsh chip buffer 404 using the Walsh index of the maximum correlation energy found by max detect block 160. Also during time slice 2, lock detector 410 filters the maximum correlation energy and uses the result to determine the lock status of which ever one of demod element front ends 400A–400D corresponds to pipelined demodulation event 0. During time slice 3, time tracking block 412 approximates the difference in signal strengths at early and late sampling points, producing a time tracking error metric which is then filtered and used to align the multipath peak of the signal to demodulation process of whichever one of demod element front ends 400A–400D correspond to pipelined demodulation event 0.

The same operations are repeated for pipelined demodulation Events 1, 2, and 3 as the corresponding Walsh symbols are received. The last pipelined demodulation event, Event 3, for the current Walsh symbol is processed by FHT processor engine 120 during time slice 4. During time slice 5, adder 418 of combiner 419 adds the output of FHT processor engine 120 for Event 3 to the partial sum obtained from the previously processed pipelined demodulation events as stored in combiner RAM 408. Also during time slice 5, dual maxima metric 414 finds the largest of the combined energies as they are output from adder 418 of combiner 419 for the Walsh symbol currently being processed, Walsh 0. During time slice 6, the same combined energy values are passed a second time from adder 418 of combiner 419 to dual maxima metric 414 to allow dual maxima metric 414 to generate a soft decision weighting in a manner described in detail below. Also during time slice 6, power control decision 416 compares the maximum combined energy calculated by dual maxima metric 414 during time slice 5 with a threshold. Power control decision 416 generates a power adjust command for the mobile unit based on the comparison. The power adjustment command is placed on the forward link power control subchannel as explained in U.S. Pat. No. 5,056,109 referenced above.

Figure 8:
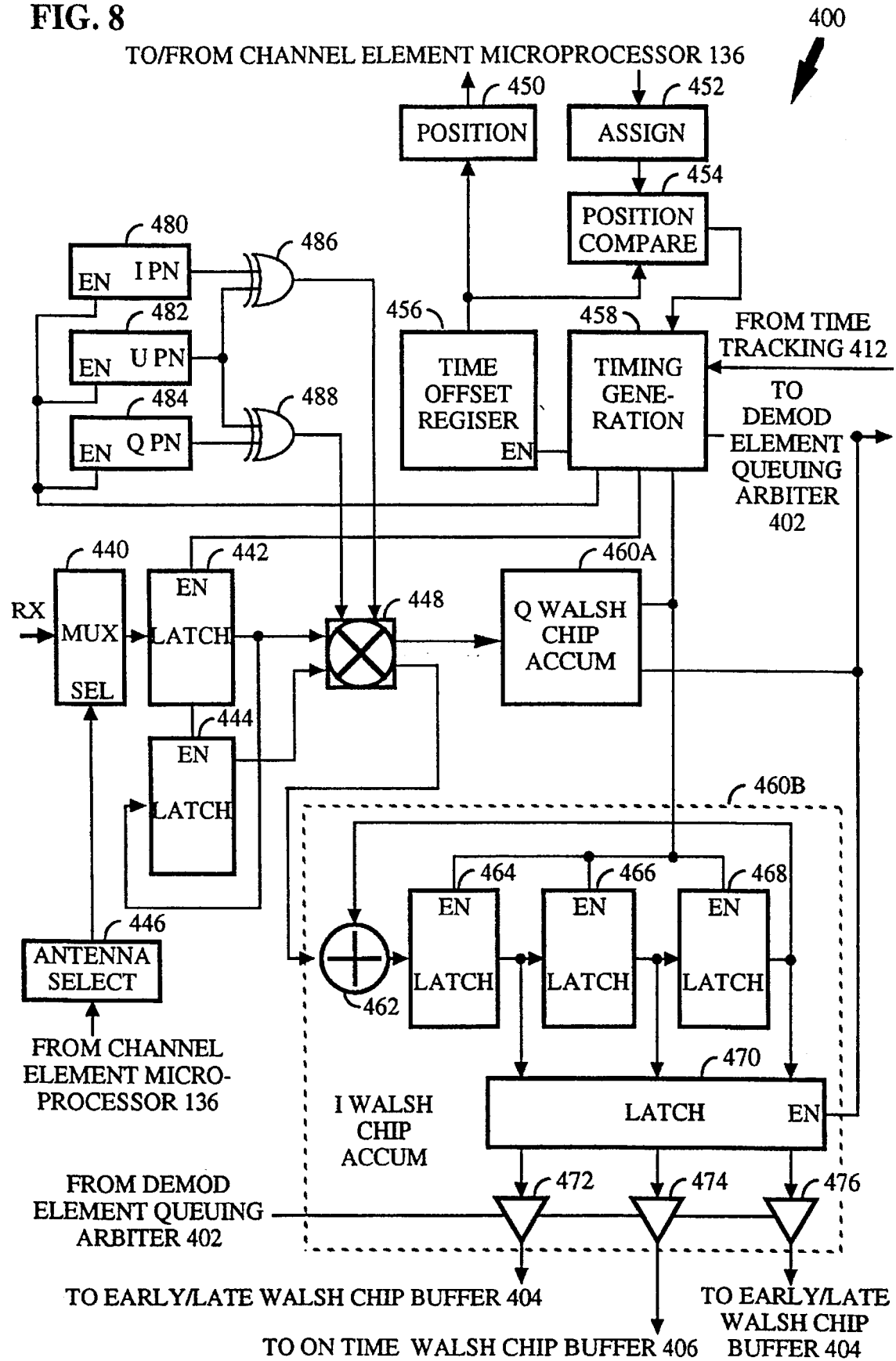
FIG. 8 is a block diagram of a demod element front end.

Referring now to FIG. 8, each demod element front end 400 includes an I PN generator 480, user PN generator 482, and Q PN generator 484. The user PN sequence modulates the I and Q PN sequences through XOR gates 486 and 488. The outputs of XOR gates 486 and 488 are used by OQPSK despreader 448 to despread the received antenna samples. I PN generator 480, user PN generator 482, and Q PN generator 484 are stepped along by a PN chip enable strobe output from timing generation block 458. In the preferred embodiment, nominally timing generation block 458 outputs one PN chip enable strobe once every 8 system clocks. Because in the preferred embodiment the system clock rate is eight times the PN chip rate, timing generation block 458 outputs the PN chip enable at the same rate the PN chips are received. However, when an advance or retard timing adjust command is received from time tracking block 412, the interval contracts to 7 system clocks or extends to 9 system clocks for one cycle and then resumes the nominal 8 system clock spacing. The effect of the contracted or expanded interval is to, respectively, advance or retard the offset being processed by demodulation element front end 400 by adjusting the alignment of the PN despreading sequence.

Time offset register 456 tracks the absolute time offset of the multipath peak being demodulated. With each advance or retard executed by timing generation block 458, time offset register 456 is either decremented or incremented appropriately. Time offset register 456 can read by channel element microprocessor 136 through position status register 450. Channel element microprocessor 136 can also assign demod element front end 400 to a new offset by writing to offset assignment register 452. When channel element microprocessor 136 commands reassignment, timing generation block 458 advances or retards appropriately in response to position compare 454 repeating the adjustments until time offset register 456 equals offset assignment register 452.

Through antenna select register 446 and MUX 440, channel element microprocessor 136 selects one of a plurality of receive antenna sample streams to demodulate. The antenna sample streams are comprised of eight samples per PN chip. Using a process referred to as decimation, a subset of the antenna samples are selected by decimator latch 442 according to the current offset and a PN chip enable signal to produce a data stream having two samples per PN chip as needed for demodulation. Timing generation block 458 enables decimator latch 442 such that the resultant samples centered on the multipath signal being demodulated. Delay latch 444 delays the previously output value as needed to despread the offset quadrature phase shift keying (OQPSK) modulation by OQPSK despreader 448. In the preferred embodiment, four of the despread samples are summed by I and Q Walsh chip accumulator 460 to form a Walsh chip value.

As previously discussed, time tracking block 412 ensures that demodulation element front end 400 is demodulating samples centered on the chosen multipath signal. As discussed in greater detail below, to perform the time tracking function, time tracking block 412 measures the difference between the signal energy of half a PN chip earlier and one half a PN chip later in time than the chosen on-time signal being demodulated. In order to calculate the signal energy at a PN chip early and late, the demodulation process must be performed for the early and late samples in the same manner as the on-time path. In FIG. 8, despreader 448 and Walsh chip accumulators 460A and 460B are time shared for on-time, early, and late processing. The OQPSK despreading of on-time, early, and late paths differ only by the alignment of the decimated antenna samples from decimation latch 442 and delay latch 444 to the PN despreading sequence from XOR gates 486 and 488. For example, demodulation of early, late, or on-time depends on whether demodulation of a Walsh chip begins on the first or second half of a PN chip, and whether the samples are then correlated with the on-time or previous chip's PN despreading sequence.

I and Q Walsh chip accumulators 460A and 460B have a three element shift register comprised of latches 464, 466, and 468 (shown only in I Walsh chip accumulator 460A for drawing clarity.) Latches 464, 466, and 468 store partial sums for the on-time, early, and late Walsh chip accumulation. The partial sums are aligned with the corresponding output from despreader 448 and circulated through until four PN chips have been summed by adder 462 to form a complete Walsh chip value. After summing a complete Walsh chip, the summed values from accumulation latches 464, 466, and 468 are latched into output latch 470. Timing generation block 458 outputs a Walsh chip strobe to demod element queuing arbiter 402. In response, demod element queuing arbiter 402 issues a buffer write enable signal to tri-state drivers 472, 474, and 476 which drive onto a bus shared commonly with all demod element front ends 400A–400D. The Walsh chip values from tri-state drivers 472, 474, and 476 and write into on-time Walsh chip buffer 406, and early/late Walsh chip buffer 404 before another Walsh chip overwrites the value stored is latch 470.

Figure 9:
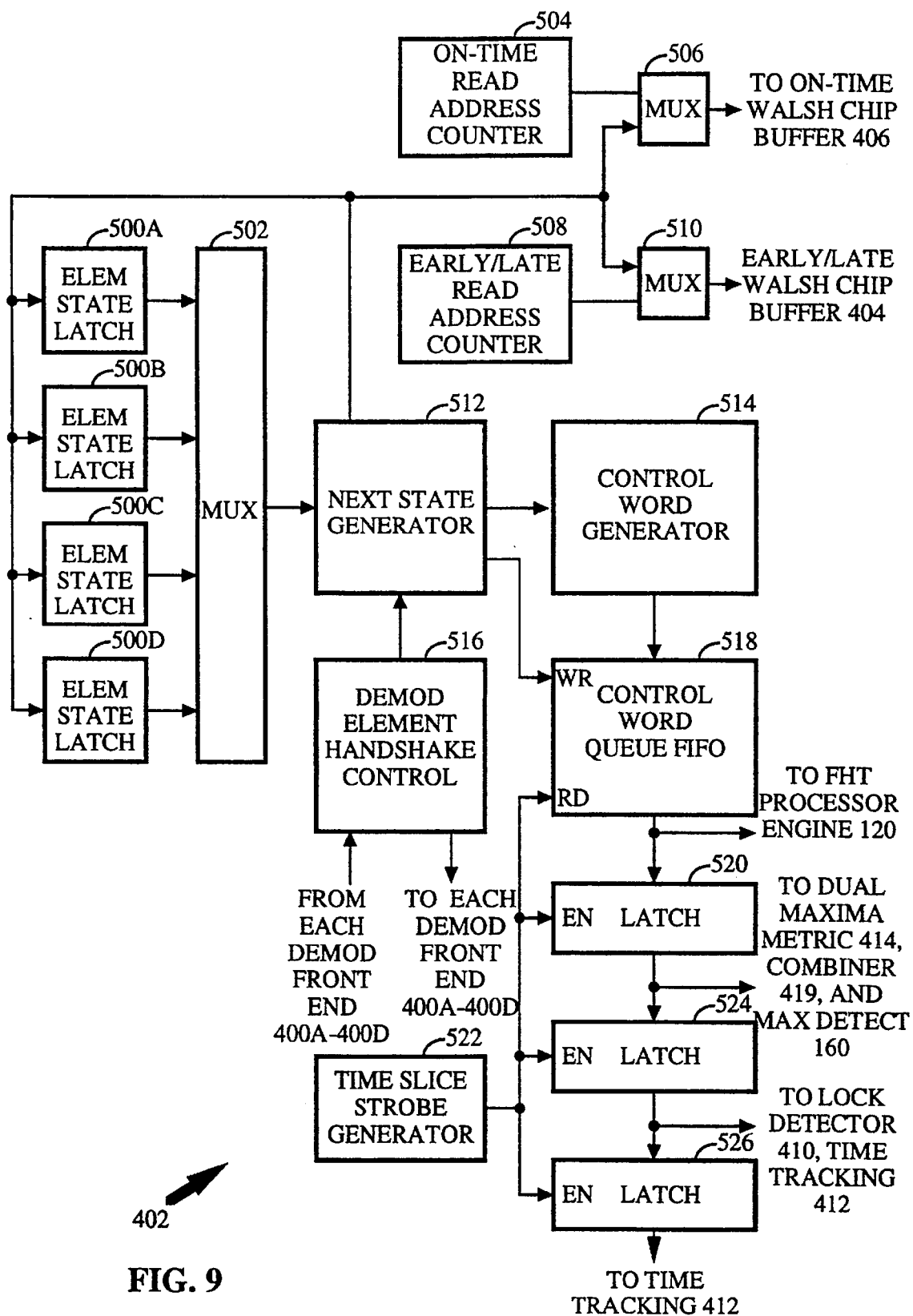
FIG. 9 is a block diagram of the demod element queuing arbiter block.

Demod element queuing arbiter 402, shown in FIG. 9, coordinates the flow of data between demod element front ends 400A–400D and FHT processor engine 120. The largest unit of time that demod element front ends 400A–400D keep track of is a Walsh chip in that demodulation element front ends 400A–400D despread and accumulate Walsh chip data without regard to which Walsh symbol the chips may correspond. Larger time scales are maintained by demod element queuing arbiter 402 in element state latches 500A–500D which track the number of Walsh chips within a Walsh symbol, the number of Walsh symbols within a power control group, and the address within on-time Walsh chip buffer 406 and early/late Walsh chip buffer 404. Among other things to be detailed later, the output of element state latches 500A–500D is used to determine when one of demod element front ends 400A–400D has stored a complete Walsh symbol in on-time Walsh chip buffer 406 which is ready to be output to FHT processor engine 120 during the next available time slice.

Demod element handshake control 516 constantly monitors for the assertion of Walsh chip strobes from demod element front ends 400A–400D. When demod element handshake control 516 receives a Walsh chip strobe, it returns a buffer write enable signal to the corresponding demod element front end 400, enabling the corresponding demod element front end 400 to output its Walsh chip value onto a common tri-state bus into early/late Walsh chip buffer 404 and on-time Walsh chip buffer 406. If two or more of demodulation element front end 400 assert a Walsh chip strobe, a priority encoder in demod element handshake control 516 determines an order to service them. While servicing one of demod element front ends 400A–400D, next state generator 512 increments the Walsh chip count state and, on proper Walsh symbol boundaries, increments the power control group within the corresponding one of element state latches 500A–500D. Next state generator 512 also increments the read addresses stored in on-time read address counter 504 and early/late read address counter 508.

When the state stored in one of element state latches 500A–500D indicates a Walsh symbol boundary has been reached, early/late Walsh chip buffer 404 and on-time Walsh chip buffer 406 each contain a complete Walsh symbol worth of data. When a Walsh symbol boundary has been reached, the identity of the corresponding demod element front end 400, the symbol count within the corresponding power control group, and a "last" bit indicating whether or not the associated pipelined demodulation event is the last to be queued for the present Walsh symbol are conveyed via MUX 502 and next state generator 512 to control word generator 514. The "last" indicator is kept track of by a state machine control word generator 514. Control word generator 514 writes the control word to control word queue FIFO (first in-first out) buffer 518. Control word queue FIFO 518 is read by pipelined demodulator processor 126 every time slice, so that even if all four demod element front ends 400A–400D reach Walsh symbol boundaries nearly simultaneously, the corresponding control words are output into pipelined demodulator processor 126 one at a time on successive time slices in the order in which the correspond Walsh symbols are serviced.

The output of control word queue FIFO 518 directly controls the read from on-time Walsh chip buffer 406 to FHT processor engine 120. On-time read address counter 504 produces the proper address for on-time Walsh chip buffer 406 through MUX 506 as selected by next state generator 512. The output of control word queue FIFO 518 also controls the operation of FHT processor engine 120 during the first time slice. During subsequent time slices, pipeline delayed versions of the control word match the pipeline operation of pipelined demodulator processor 126 such that the control word is always time aligned with the data to which it corresponds. (For more detail on the pipelined process, refer again to FIG. 7.) First latch 520 pipeline delays the control word for output to max detect block 160, combiner 419, and, when the "last" bit output is asserted, also controls dual maxima metric 414. If the control word indicates that no pipelined demodulation events are available for max detect block 160, max detect block 160 can then be used by integrated search processor 128. The output of second pipeline latch 524 controls the read of Walsh chips from early/late Walsh chip buffer 404 to time tracking block 412. Early/late read address counter 508 produces the proper address for early/late Walsh chip buffer 404 through MUX 510 as selected by the output of next state generator 512. The output of second pipeline latch 524 also controls the operation of lock detector 410. When the "last" bit output is asserted latch 524 also controls the operation of combiner 419, dual maxima metric 414, and power control decision 416 (not shown in FIG. 9) as detailed below. The output of third pipeline latch 526 controls operation of time tracking block 412. Time slice strobe generator 522 provides a time slice boundary strobe which advances the control word through latches 520, 524, and 526.

During each time slice, two Walsh chips must be written into on-time Walsh chip buffer 406 from each of demod element front ends 400A–400D, and if a Walsh symbol of data is available for demodulation during a time slice, the full Walsh symbol comprising 64 Walsh chips must be read from on-time Walsh chip buffer 406. To support the transfer of data in and out of on-time Walsh chip buffer 406, on-time Walsh chip buffer 406 is divided into independently readable and writeable even and odd Walsh chip halves. During a read by FHT processor engine 120, write operations from demod element front ends 400A–400D to on-time Walsh chip buffer 406 are then multiplexed in between read operations. The read and write operations toggle between the even and odd buffer halves on successive clocks. A Walsh chip is written to the odd half of the buffer while a Walsh chip is being read from the even half of the buffer and vice versa. Alternatively a dual port ram could be used.

In the preferred embodiment, each demod element front ends 400A–400D can share the same even and odd buffer halves since only one of demod element front ends 400A–400D can be written to on-time Walsh chip buffer 406 during any time slice. Early/late Walsh chip buffer 404 and on-time Walsh chip buffer 406 are written together and thus use the same write address generator derived from the corresponding element state latch 500. As shown in FIG. 9, independent read address counters are needed for early/late Walsh chip buffer 404 and on-time Walsh chip buffer 406 because the early/late buffer read is pipeline delayed two time slices from the on-time buffer read.

In order to handle the delay between the time when a Walsh symbol of data becomes available and when the Walsh symbol is output to FHT processor engine 120, on-time Walsh chip buffer 406 and early/late Walsh chip buffer 404 in the preferred embodiment store one and one fourth of a Walsh symbol of data (i.e. 5/4 of a Walsh symbol.) The worst case delay, and a common one, occurs when each of demodulation element front end 400 are assigned to multipath peaks offset in time only a small amount from one another such that the corresponding Walsh symbol boundaries occur rapidly one after another. If such a worst case delay situation occurs just after the start of a new time slice, that time slice must elapse before first Walsh symbol can be output to FHT processor engine 120. Three additional time slices are used to output the other stored Walsh symbol. Then an additional two time slices must pass before early/late Walsh chip buffer 404 outputs the data corresponding to the last pipelined demodulation event. Thus a total of seven time slices, or fourteen Walsh chips may elapse before the contents of the on-time Walsh chip buffer 406 and early/late Walsh chip buffer 404 have been completely read. During this delay interval the Walsh chip values being written into the buffer cannot overwrite any of the values which haven't been read. By using a circular buffer that is 5/4 of a Walsh symbol deep, the start of one Walsh symbol is always 1/4 of a Walsh symbol, or sixteen Walsh chips from the start of the following Walsh symbol in the buffer thus ensuring that the write pointer can never overtake the read pointer of the buffer. A Walsh symbol count modulo 5 is maintained in element state latch 500 and indicates which of the five possible addresses on which the current Walsh symbol starts. The chosen address is used as a base address for the read of 64 Walsh chips to FHT processor engine 120.

As explained in detail above, a Walsh function of order n can be defined recursively as follows:

$$W(n) = \begin{vmatrix} W(n/2), & W(n/2) \\ W(n/2), & W'(n/2) \end{vmatrix}$$

where W' denotes the logical complement of W, and W(1)=0. In the preferred embodiment a Walsh sequence is generated where n=6, therefore a 6-stage butterfly trellis is used to correlate the 64 input values with each of the 64 possible Walsh functions within FHT processor engine 120. The butterfly trellis structure and method of operation for FHT processor engine 120 are detailed in a co-pending U.S. patent application Ser. No. 08/173,460 entitled "METHOD AND APPARATUS FOR PERFORMING A FAST HADAMARD TRANSFORM," by H. Dehesh, filed Dec. 22, 1993, assigned to the assignee of the present invention and incorporated herein by reference. Max detect block 160 determines the largest of the 64 correlation energies outputs of FHT processor engine 120 and passes the value of the maximum energy to lock detector 410 and the Walsh index corresponding to the maximum energy to time tracking block 412.

Figure 10:
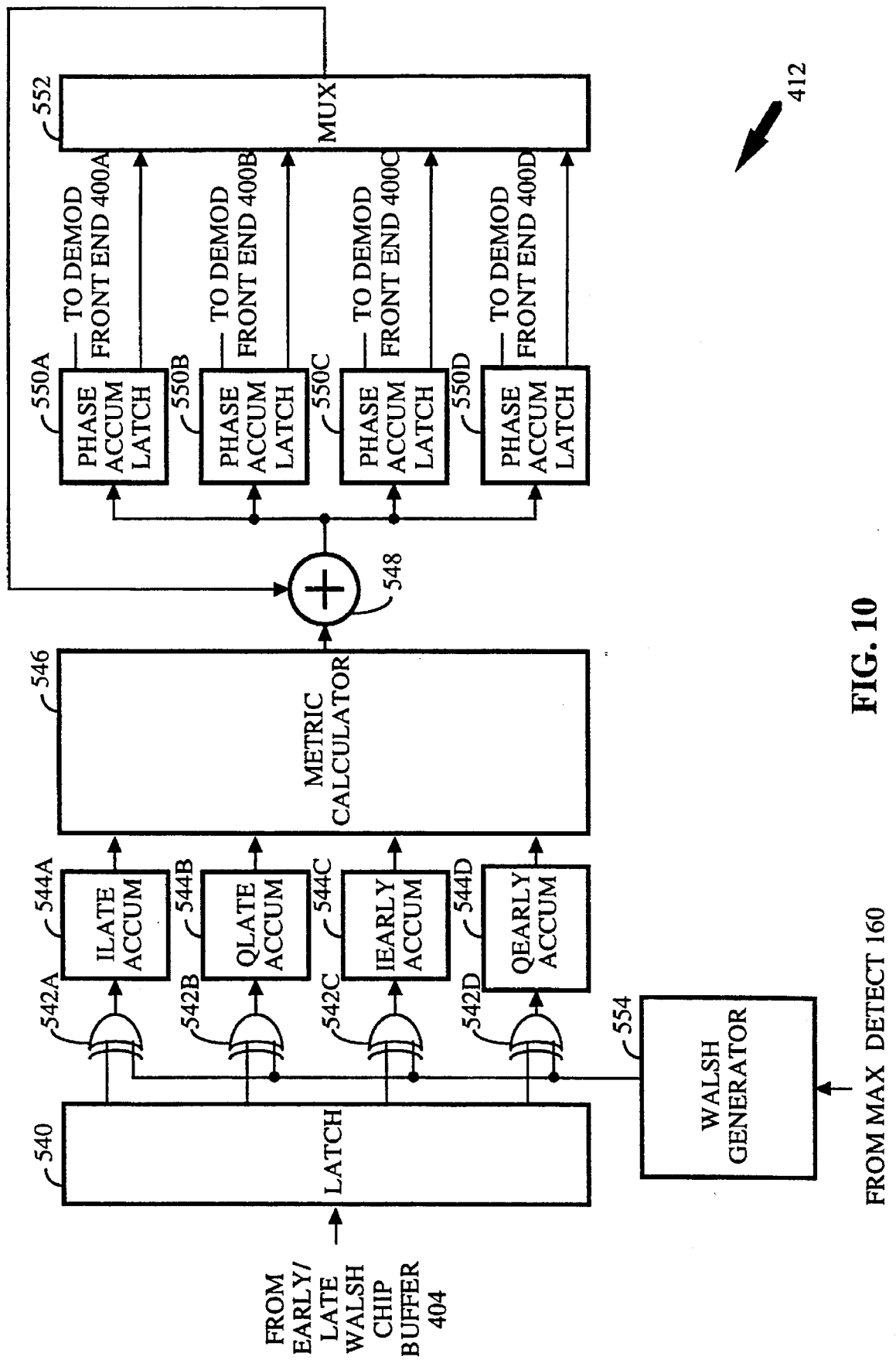
FIG. 10 is a block diagram of the time tracking block.

The processing in time tracking block 412 is completed during two consecutive time slices. As shown in FIG. 10, within time tracking block 412, Walsh generator 554, latch 540, XOR gates 542A–542D, accumulators 544A–544D, metric calculator 546, and adder 548 form the data path that is shared across pipelined demodulation events on a time-slice basis. During the first time slice of the time tracking process, time tracking block 412 generates the Walsh sequence corresponding to the Walsh index received from max detect block 160 in Walsh generator 554. Time tracking block 412 correlates the Walsh sequence to the early and late Walsh chips that are read from early/late Walsh chip buffer 404 into latch 540 on the third time slice after the corresponding demodulation of the on-time sample. Early and late, I and Q Walsh chips are correlated with the Walsh sequence by XOR gates 542A–542D. The results of the correlation are summed into corresponding accumulators 544A–544D such that the greater the correlation between the input received Walsh chips from latch 540 and the Walsh sequence from Walsh generator 554, the larger the values stored in accumulators 544A–544D.

Note that with the time sliced approach, time tracking block 412 only has to wait one time slice for max detect block 160 to determine the maximum correlation energy output of FHT processor engine 120 and the corresponding Walsh index. In the prior-art real-time-slaved approach of FIG. 3, the demodulation process takes an entire Walsh symbol, and an extra Walsh symbol of delay in buffer 40 is needed to store the early/late Walsh chips until they can be used. With the time slice approach, the storage of early/late Walsh chips is eliminated for a sizable area savings and faster loop response.

During the second time slice, the energy for the early and late offsets is approximated by metric calculator 546. (Because the energy levels are used for a relative comparison, metric calculator 546 may use a simple approximation instead of a true energy calculations for area savings.) The early energy approximation is subtracted from late energy approximation to produce a time tracking error metric. The calculated error metrics for each of demod element front ends 400A–400D are summed into corresponding phase accum latches 550A–550D. Adder 548 adds the current error metric to the appropriate accumulated error in phase accum latches 550A–550D as selected by MUX 552. If one of demod element front ends 400A–400D is sampling too early, the corresponding phase error metric is positive. Accumulating a series of positive phase errors can cause latch 550 to overflow. The overflow condition generates a retard to re-center the decimator sample alignment around the multipath signal peak. Likewise accumulating a series of negative phase errors can cause the latch 550 to underflow. The underflow condition generates an advance to re-center the decimator sample point around the multipath signal peak. An alternative implementation can store the error metrics in holding latches, along with the Walsh indexes used to latch them, and only allow the metrics to sum into the phase accumulators when the Walsh index used matches a final selected combined Walsh index.

Figure 11:
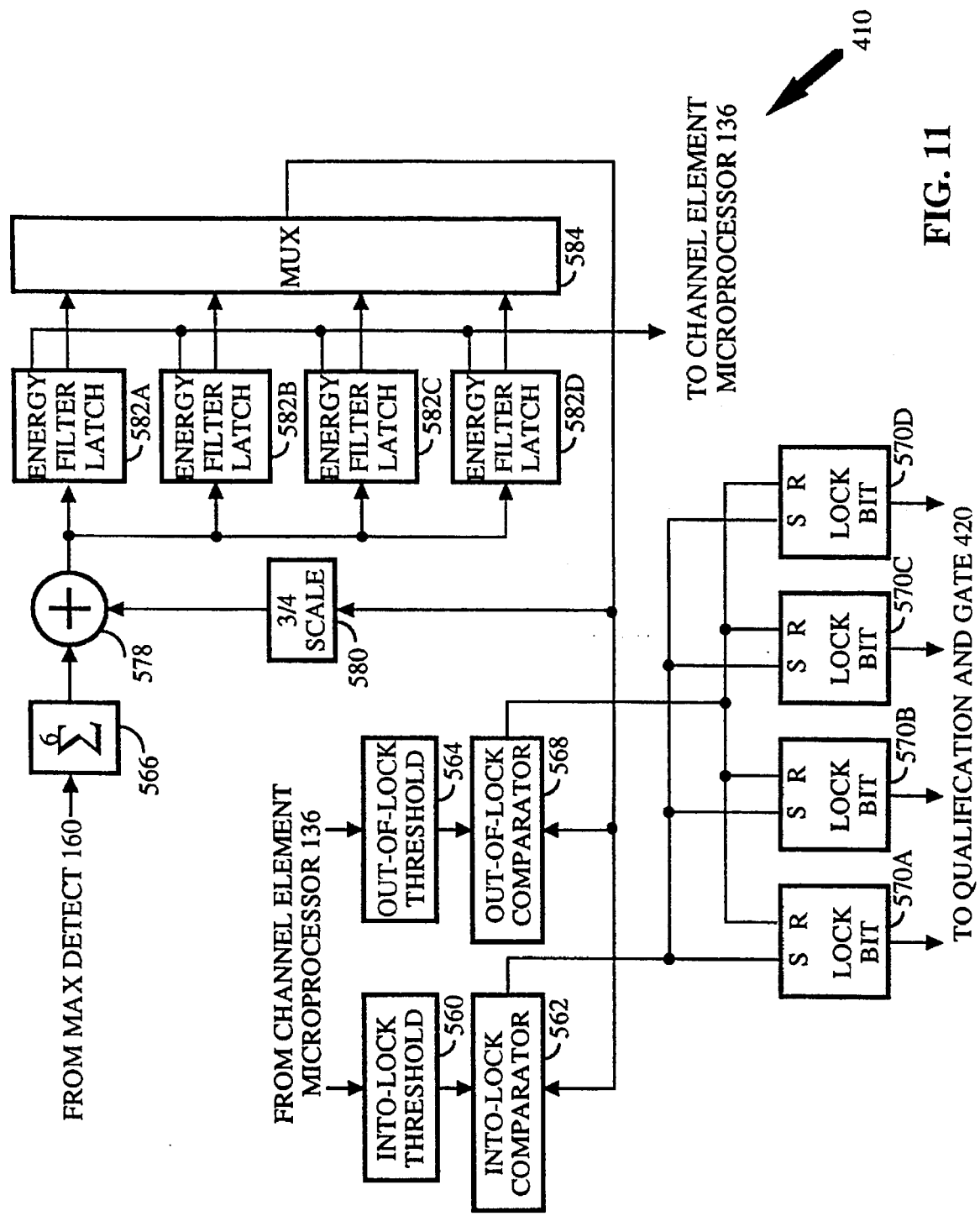
FIG. 11 is a block diagram of the lock detector block.

Referring back to FIG. 11, lock detector 410 uses an infinite impulse response (IIR) filter to compute a long term average energy for each multipath signal peak being tracked by demodulation element front ends 400A–400D. Each of demod element front ends 400A–400D has a corresponding energy filter latch 582A–582D and a corresponding lock bit set/reset latch 570A–570D. Max detect block 160 outputs the maximum demodulation energy level to power group accumulator 566, which sums the energy inputs over six consecutive Walsh symbols. When the control word provided by demod element queuing arbiter 402 indicates that the Walsh symbol is the sixth and last in a power group, the output of power group accumulator 566 is summed in filter adder 578 with 3/4 of the filter value stored in the corresponding one of energy filter latches 582A–582D as selected by MUX 584. Scalar block 580 provides a ¾ feedback weight that results in a low pass IIR filter. An alternative implementation can filter at the Walsh symbol rate using, for example, a ¹⁵⁄₁₆ feedback weighting and obtain similar filter response.

The filtered energy output by MUX 584 is compared with the value stored in into-lock threshold 560 and the value stored in out-of-lock threshold 564 by into-lock comparator 562 and out-of-lock comparator 568 respectively. If the energy is above the value stored in into-lock threshold 560 the corresponding one of lock bit set/reset latches 570–570D is set to the in-lock state. If the energy is below the value stored in out-of-lock threshold 546, the corresponding one of lock bit set/reset latches 570–570D is reset to the out of lock state. Otherwise the lock state remains unchanged. This produces a hysteresis effect on the lock state in that once the lock mechanism falls out of lock the energy must rise above the value stored in into-lock threshold 560 to go back into lock, and once the lock mechanism is locked the energy must fall below the value stored in out-of-lock threshold 564 to go out of lock.

The power group accumulator 566, filter adder 578, scalar block 580 and comparators 562 and 568 comprise the data path through which each of the pipelined demodulation events are processed. Channel element microprocessor 136 can compare filtered energy stored in energy filter latches 582A–582D to those of other potential multipath peaks found by integrated search processor 128. Channel element microprocessor 136 can reassign demod element front ends 400A–400D to new offsets corresponding to peaks found by integrated search processor 128 as the multipath environment changes and peaks come and go.

Combiner 419, shown in FIG. 6, sums like-indexed correlation energies for each of the pipelined demodulation events corresponding to one of demodulation element front ends 400A–400D in a in-lock condition as they are processed using combiner adder 418. The partial sums are stored in a combiner RAM 408. AND gate 420 zeros the correlation energies for a pipelined demodulation event if the corresponding lock indicator provided by lock detector 410 is in the out-of-lock state. While processing the first pipelined demodulation event for the current Walsh symbol, the input term from combiner RAM 408 to combiner adder 418 is zeroed so that the energies from FHT processor engine 120 are simply stored in the combiner RAM 408. When the subsequent pipelined demodulation events corresponding to the current Walsh symbol are processed, the stored value is read back from the combiner RAM 408, added by combiner adder 418 to the input correlation energy and written back into combiner RAM 408 as a new partial sum. When the last pipelined demodulation event for the current Walsh symbol is processed, the final combined correlation energies are passed to dual maxima metric 414 as the values are also written into combiner RAM 408. By combining the pipelined demodulation event results as they are processed, combiner RAM 408 also naturally functions to time align the pipelined demodulation events thus eliminating the need for deskew buffer 54 of the prior art configuration shown in FIG. 3.

In the preferred embodiment, the maximum allowable time difference between two multipath signal peaks assigned to one of demodulation element front ends 400A–400D is a Walsh symbol. If this were not the case, combiner RAM 408 would have to maintain partial sums for more than one Walsh symbol, and the control logic for combiner 419 and control word generator 514 of FIG. 9 would be more complex. An alternate implementation may remove the one Walsh symbol multipath deskew restriction by increasing the complexity of the control logic of pipelined demodulator processor 126.

Figure 12:
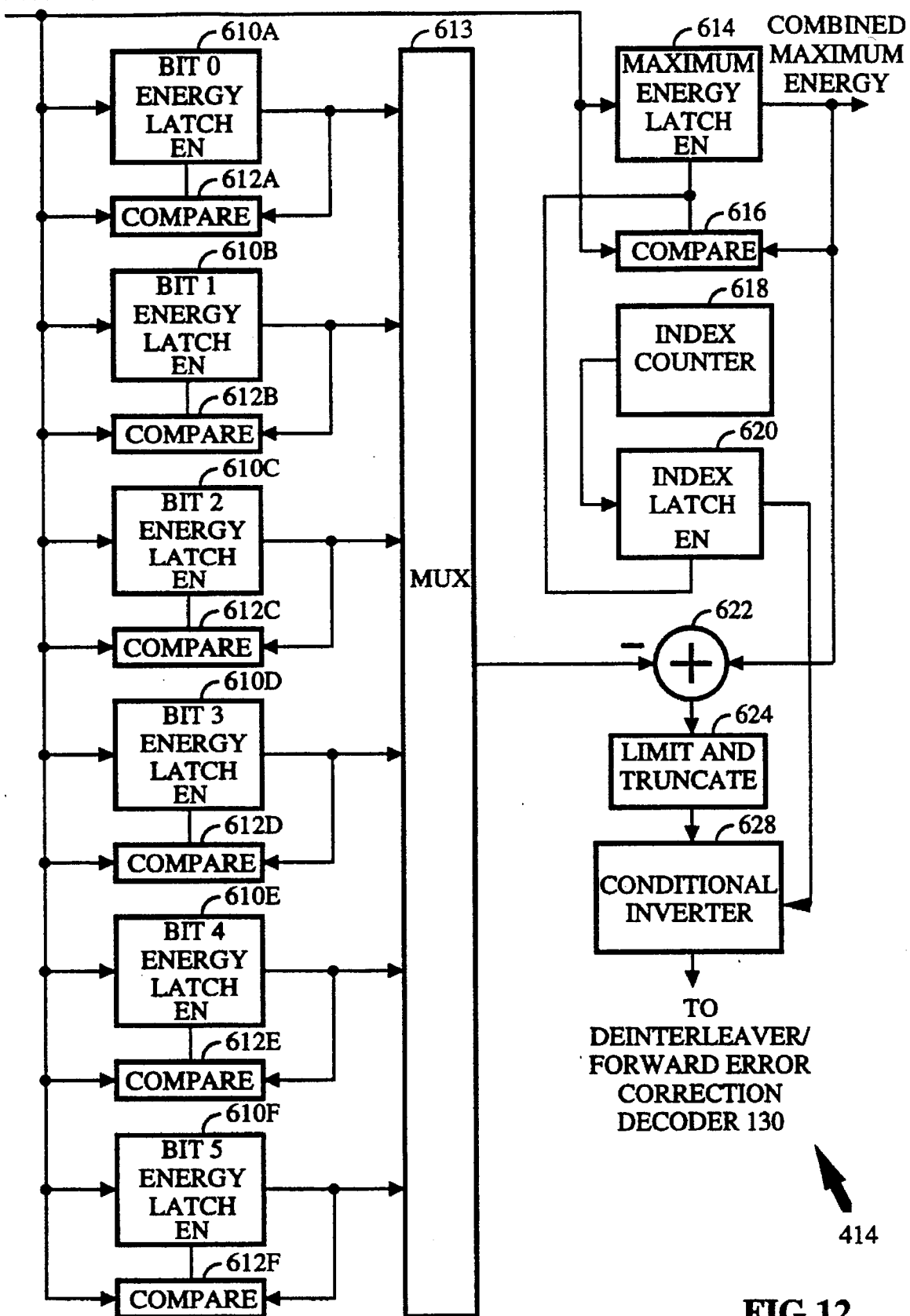
FIG. 12 is a block diagram of the dual maxima metric block.

The processing in dual maxima metric block 414 is completed during two consecutive time slices and is detailed in a U.S. Pat. No. 5,442,627, issued Aug. 15, 1995 entitled "NONCOHERENT RECEIVER EMPLOYING A DUAL-MAXIMA METRIC GENERATION PROCESS," and assigned to the assignee of the present invention. During the time slice when pipelined demodulator processor 126 is servicing the latest arriving output for the current Walsh symbol and adder 418 is producing the final combined energy values, dual maxima metric 414 finds the maximum of the combined energy values. The detailed blocks of dual maxima metric 414 is shown in FIG. 12. The first energy value output from adder 418 is stored in maximum energy latch 614. For each successive correlation energy serially input to dual maxima metric 414, comparator 616 determines if the new energy value is larger than the stored value in maximum energy latch 614. If the energy value is larger, the maximum energy latch 614 is enabled and the new energy value is stored in maximum energy latch 614 as the maximum energy. A Walsh index counter 618 keeps track of the Walsh symbol index corresponding to each energy value received as they are input to the dual maxima metric block 414. When comparator 616 indicates a new maximum value has been received, the corresponding Walsh index is latched into index latch 620.

During the next time slice, the same energy values output during the previous time slice which have now been stored in combiner RAM 408 are output once again from combiner 419 to dual maxima metric 414. During this second time slice, each one of bit energy latches 610A–610F and comparators 612A–612F pairs determines the largest energy value of the set of Walsh symbols having the opposite polarity to the maximum energy index latched in index latch 620 for one of the six binary digits. For example, if the Walsh index of the maximum combined correlation energy value was 101100, then bit 0 energy latch 610A and comparator 612A would find the largest of all odd correlation energies, i.e. the set of energy values whose corresponding Walsh index least significant bit was a 1. Bit 5 energy latch 610F and comparator 612F and would find the largest of the first 32 correlation energy values, i.e. the set of energies having a corresponding Walsh index with a most significant bit equal to 0. The energy values stored in comparators 612A–612F are then selected, one at a time, through MUX 613 and subtracted from the maximum combined correlation energy by adder 622. The output of adder 622 provides a soft decision weighting for the demodulated symbol stream stored in index latch 620. Conditional inverter 628 provides soft decision magnitude data which is conditionally inverted based on the corresponding bit value (either 1 or 0) for the selected index stored in index latch 620. Alternatively a single pass implementation of dual maxima metric 414 could be used within the scope of the present invention. One such single pass architecture could use twelve comparator-latch pairs instead of six to determine the complementary energies for both alternatives without requiring that the energy values be input twice.

The soft decision output of conditional inverter 628 is passed on to the deinterleaver/decoder 130. In contrast to the method of combining for FIG. 2, in which only the largest of the correlation energies from each demodulation element contributes to the final combined symbol, each of the 64 correlation energy values from each pipelined demodulation event plays a role in determining the maximum combined correlation energy. The dual maxima process is feasible because all the pipelined demodulation event processing takes place on a single die and the combination and decoding processes take place with minimal microprocessor control. In the prior art configuration of FIG. 2, each demodulation element 22 is separately controlled by microprocessor 34. If dual maxima decoding were attempted with the prior art configuration of FIG. 2, the information bandwidth required of microprocessor 34 would mandate a faster, more expensive microprocessor.

Figure 13:
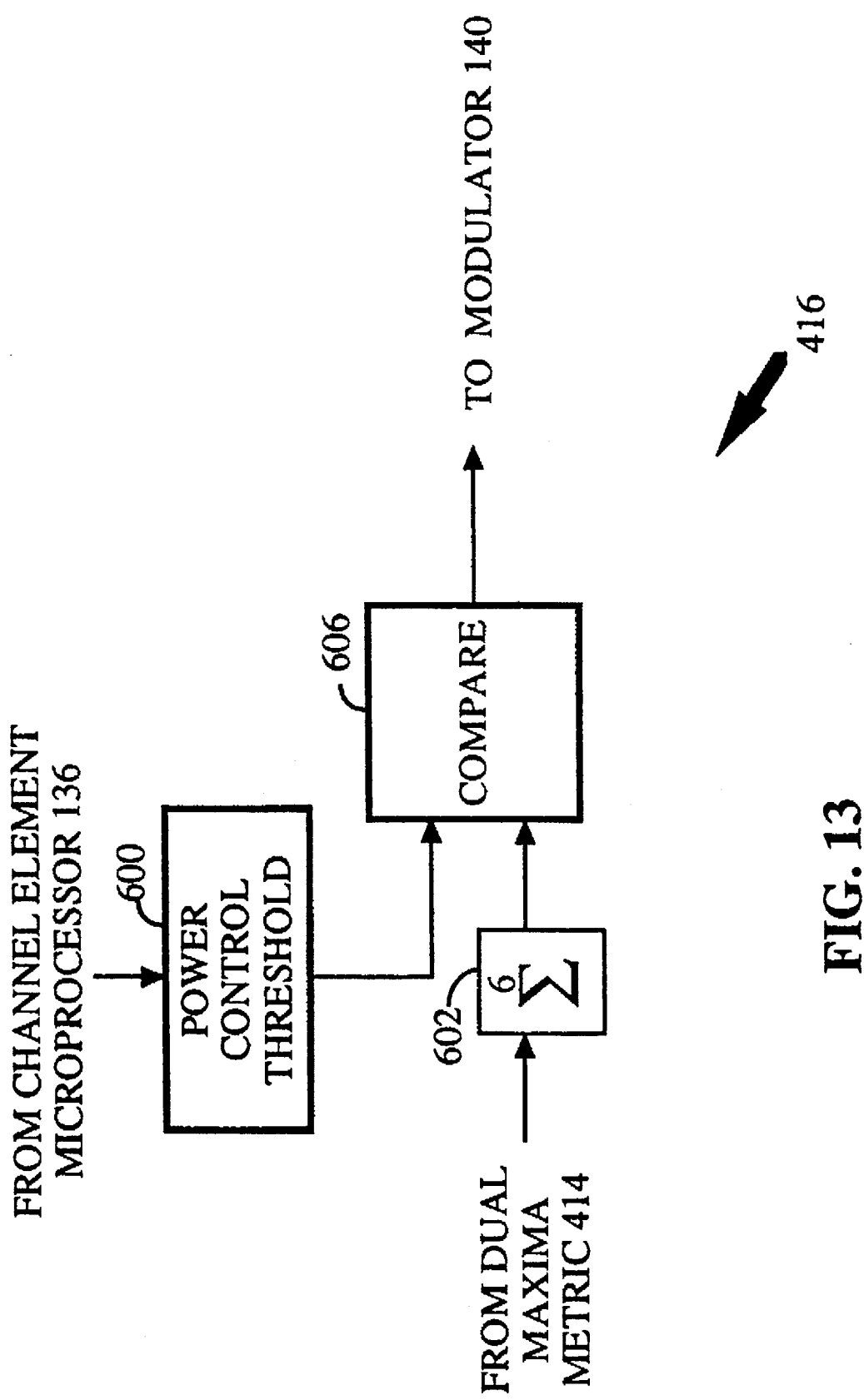
FIG. 13 is a block diagram of the power control decision block.

Power control decision 416 shown in FIG. 13 sums the maximum combined correlation energy provided by dual maxima metric block 414 over the six consecutive Walsh symbols of a power control group in power group accumulator 602. The output of power group accumulator 602 is compared using comparator 606 with a power control threshold stored in power control threshold 600 specified by channel element microprocessor 136. If the output of power group accumulator 602 exceeds the power control threshold stored in power control threshold 600, a decrease power command is sent to the mobile unit on the forward link power control subchannel. If the output of power group accumulator 602 is less than the power control threshold stored in power control threshold 600, an increase power command is sent. An alternative implementation can select one of a set of thresholds based on the number of demodulation element front ends that are contributing to the combining process. Another alternative implementation may weigh the maximum correlation energy from each demod element instead of using the maximum combined correlation energy.

The architecture of the present invention has many advantages over the prior art configurations. For example, because the complex processing blocks are shared across a set of demodulation element front end blocks, the ability to demodulate an additional signal path can be added by simply adding a new demodulation element front end block. The demodulation element front end block does not require a significant die area and therefore the cost of extended demodulation capability is reasonably low.

The architecture of the present invention is also expandable in another manner by increasing the frequency at which the FHT process is clocked. By doubling the clock rate of the FHT processor engine, the rate at which symbols are processes is also doubled. Thus doubling the clock rate of the FHT processor engine may facilitate additional demodulation element front end blocks or the processing of more symbols for the searching process. A higher clock rate of the FHT processor can also be used to accommodate higher data rates over the air interface in the same manner. For example, if the rate at which the data is received over the air is doubled, the rate at which the FHT processor operates can simply be doubled and the same architecture can support twice as much data throughput.

Figure 3:
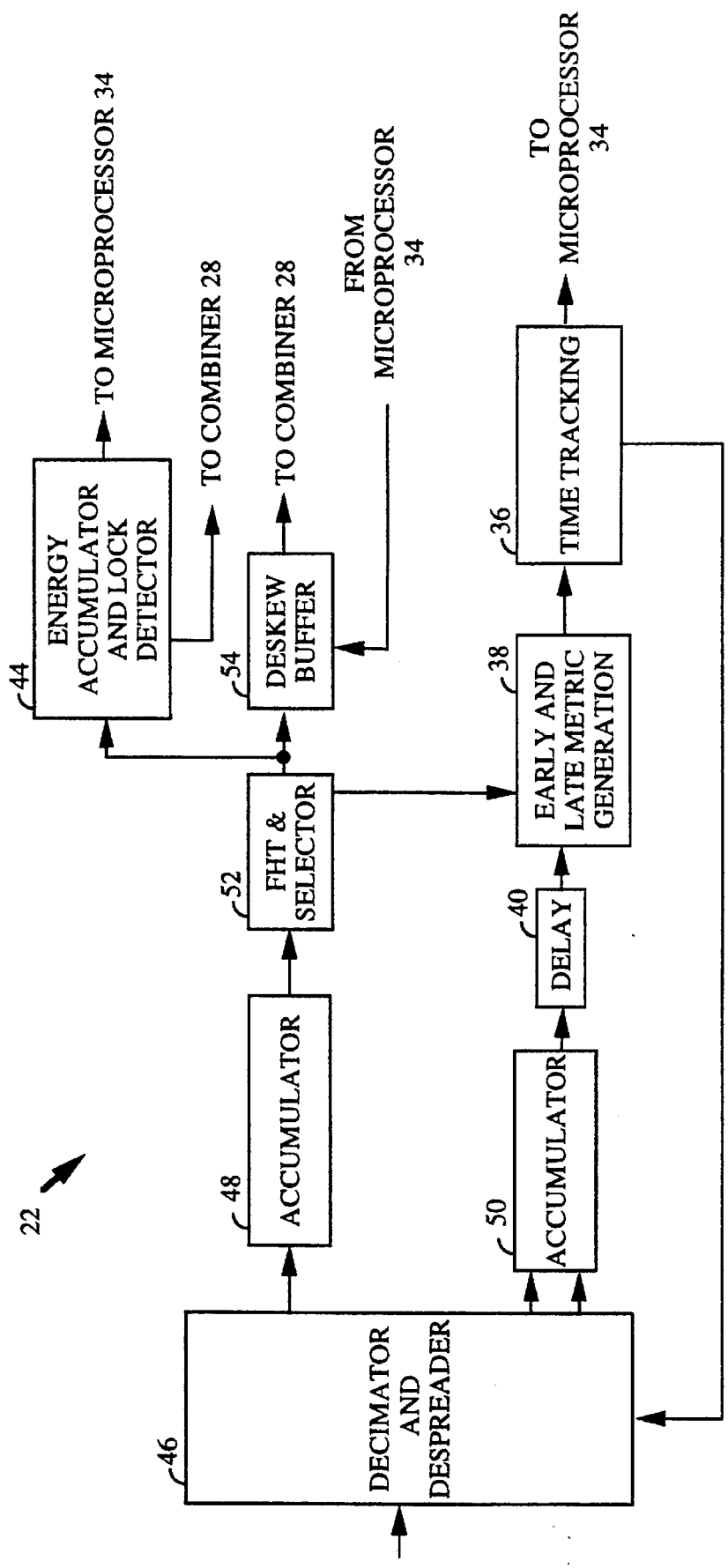
FIG. 3 is a block diagram of a demod element in a prior art communications network demodulation system.

Another significant advantage of the present invention is the elimination of the need to store large blocks of data to perform the time tracking function. In FIG. 3, delay 40 delays the output of accumulator 50 by storing the Walsh symbols output from time tracking accumulator 50 until the results of main data path FHT and selector 52 are available. In the prior art, the results of FHT and selector 52 performs only one Walsh symbol transformation during each Walsh symbol duration thus producing a delay of one Walsh symbol from input to output. Thus delay 40 must store a complete Walsh symbol worth of data for output to early and late metric generation 38 while continuing to store incoming data. Using the present invention, the result of the FHT process for each Walsh symbol received are available for use in the time tracking circuitry within a few time slices after Walsh symbol has been completely received thus greatly reducing the amount of data that must be stored. Therefore the size and cost of early/late Walsh chip buffer 404 are much less than the size and cost of delay 40.

Another significant advantage of the present invention is the minimal amount of microprocessor control which is required to control operation. Referring once again to FIG. 2 and FIG. 3, note that microprocessor 34 controls operation on a symbol by symbol basis as the results of each demodulation element 22 are combined in combiner 28 and processed by the subsequent processing block. The present invention eliminates the need for such direct and continuous control by a microprocessor. Thus channel element microprocessor 136 of FIG. 5 may be a much less powerful microprocessor than microprocessor 35 of FIG. 2. Alternatively a single powerful microprocessor can be used to control a plurality of channel element modems and other base station functions.

There are many configurations for spread spectrum multiple access communication systems not specifically described herein but with which the present invention is applicable. For example, other encoding and decoding means could be used instead of the Walsh encoding and FHT decoding. There are also many minor architecture changes which are encompassed in the present invention. For example each demodulation element front end could store its own despread chips and provide a Walsh symbol worth of data directly to the FHT processor thereby eliminating the need for a chip buffer. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A pipelined demodulation processor receiving an antenna signal comprised of a group of spread spectrum modulated call signals sharing a common frequency band and processing an active call signal within said group of spread spectrum modulated call signals, said active call signal originating from a remote transmitting unit, said pipelined demodulation processor comprising:

a plurality of demodulation element front ends for receiving data samples of said group of spread spectrum modulated call signals wherein each of said spread spectrum modulated call signals comprises a series of bits encoded in groups of a fixed length into a series of symbols comprised of a series of code chips having a transmission rate and wherein said data samples are received at a rate corresponding to said transmission rate, and for providing despread code chips;

a chip buffer for receiving said despread code chips from each of said plurality of demodulation element front ends and storing a limited number of said despread code chips to collect a set of said despread code chips to create a first element symbol from a first one of said plurality of demodulation element front ends and corresponding to a first transmitted symbol;

a transform processor engine for receiving from said chip buffer said first element symbol and decoding said first element symbol to produce a first series of estimates wherein said first series of estimates comprises an energy level corresponding to each possible code sequence of said corresponding series of bits wherein said transform processor engine decodes said first element symbol at a rate higher than said transmission rate;

a combiner for receiving and storing said first series of estimates;

a maximum detector for receiving said first series of estimates and determining a maximum energy level and corresponding code sequence of said first series of estimates; and a time tracking block for receiving an indication of said code sequence corresponding to said maximum energy level and for providing an advance or retard indication to said first one of said demodulation element front ends.

2. The pipelined demodulation processor of claim 1 wherein said chip buffer is further for storing a limited number of said despread code chips to collect a second set of said despread code chips to create a second element symbol from a second one of said plurality of demodulation element front ends and corresponding to said first transmitted symbol, wherein said transform processor engine is further for receiving from said chip buffer said second element symbol and decoding said second element symbol to produce a second series of estimates wherein said second series of estimates comprises an energy level corresponding to each possible code sequence of said corresponding series of bits, and wherein said combiner is further for receiving said second series of estimates, adding each of said energy levels of said second series of estimates to a set of energy levels of a stored series of estimates according to corresponding like code sequence, and for providing a summed series of estimates, said pipeline processor further comprising a dual maxima metric for receiving said summed series of estimates corresponding to said first transmitted symbol and providing a soft decision output corresponding to said first transmitted symbol.

3. The pipelined demodulation processor of claim 2 wherein said stored series of estimates is said first series of estimates.

4. The pipelined demodulation processor of claim 2 wherein said stored series of estimates is a sum of said first series of estimates and at least one other series of estimates.

5. The pipelined demodulation processor of claim 2 further comprising a power control decision block for receiving said soft decision output and providing a power control indication intended for said remote transmitting unit.

6. The pipelined demodulation processor of claim 1 further comprising a lock detector for receiving said maximum energy level and providing an indication as to whether said first one of said demodulation element front ends is assigned to a valid call signal.

7. The pipelined demodulation processor of claim 1 further comprising an integrated search processor for receiving said data samples of said group of spread spectrum modulated call signals, and for providing a first search symbol, and wherein said transform processor engine is further for receiving from said integrated search processor said first search symbol and decoding said first search symbol to produce a first search series of estimates.

8. The pipelined demodulation processor of claim 1 further comprising a queuing arbiter for controlling transfer of said despread code chips from each of said plurality of demodulation element front ends to said chip buffer and transfer of said first element symbol from said chip buffer to said transform processor engine.

9. The pipelined demodulation processor of claim 1 wherein each of said plurality of demodulation element front ends is further for providing early despread code chips and late despread code chips, said pipelined demodulation processor further comprising an early and late chip buffer for receiving said early despread code chips and said late despread code chips from each of said plurality of demodulation element front ends and storing a limited number of said early despread code chips to collect a set of said early despread code chips to form a first early symbol corresponding said first element symbol and storing a limited number of said late despread code chips to collect a set of said late despread code chips to form a first late symbol corresponding to said first element symbol.

10. The pipelined demodulation processor of claim 9 further comprising a queuing arbiter for controlling transfer of said despread code chips from each of said plurality of demodulation element front ends to said chip buffer, transfer of said early despread code chips from each of said plurality of demodulation element front ends to said early and late chip buffer, transfer of said late despread code chips from each of said plurality of demodulation element front ends to said early and late chip buffer, and transfer of said first element symbol from said chip buffer to said transform processor engine.

11. The pipelined demodulation processor of claim 9 wherein said time tracking block is further for receiving said first early symbol, correlating said first early symbol with said code sequence corresponding to said maximum energy level to produce an early energy level, for receiving said first late symbol, correlating said first late symbol with said code sequence corresponding to said maximum energy level to produce a late energy level, and for finding a difference between said early energy level and said late energy level and using said difference to generate said advance or retard indication.

12. The pipelined demodulation processor of claim 1 wherein each of said plurality of demodulation element front ends comprises:

a pseudonoise (PN) sequence generator for producing a sequence of PN data chips wherein said sequence of PN data chips corresponds to a sequence of PN data chips used to modulate said active call signal, wherein each of said plurality of demodulation element front ends produces said sequence of PN data chips offset in time from each other of said plurality of demodulation element front ends;

a decimation multiplexer for receiving said data samples of said group of spread spectrum call signals and selecting a portion of said data samples;

a despreader for correlating said portion of said data samples with said sequence of PN data chips and for producing correlated output bits;

a chip accumulator for accumulating a group of said correlated output bits to form a complete one of said despread code chips; and a timing generation register for controlling said offset in time of said sequence of PN data chips and said selection of said portion of said data samples.

13. A method of demodulating a signal received in a group of signals, wherein said signal is comprised of a series of data bits encoded in fixed length groups into a series of symbols wherein said series of symbols are transmitted at a symbol rate, and wherein said signal is spread spectrum modulated with a pseudonoise (PN) sequence aligned to a transmission time, said method of demodulating comprising the steps of:

despreading a first fixed length set of samples of said signal with said PN sequence offset in time by a first amount from said transmission time to produce at said symbol rate a first series of symbol estimates;

despreading a second fixed length set of samples of said signal with said PN sequence offset from said first amount by an early factor to produce a first early series of symbol estimates;

despreading a third fixed length set of samples of said signal with said PN sequence offset from said first amount by a late factor to produce a first late series of symbol estimates;

decoding during a first time slice a first symbol estimate of said first series of symbol estimates to produce a first set of index estimates, said first set of index estimates comprising an energy value corresponding to each possible symbol value corresponding to a first transmitted symbol;

determining during a second time slice a maximum energy value of said first set of index estimates;

storing during said second time slice said first set of index estimates to produce a stored set of index estimates;

uncovering during a third time slice an early energy value by correlating said first early series of symbol estimates with said symbol value corresponding to said maximum energy value;

uncovering during said third time slice a late energy value by correlating said first late series of symbol estimates with said symbol value corresponding to said maximum energy value;

summing during a fourth time slice a difference between said early energy value and said late energy value to a stored timing value;

despreading a fourth fixed length set of samples of said signal with said PN sequence offset in time by a second amount from said transmission time to produce at said symbol rate a second series of symbol estimates;

despreading a fifth fixed length set of samples of said signal with said PN sequence offset from said second amount by said early factor to produce a second early series of symbol estimates;

despreading a sixth fixed length set of samples of said signal with said PN sequence offset from said second amount by said late factor to produce a second late series of symbol estimates;

decoding during a fifth time slice a second symbol estimate of said second series of symbol estimates to produce a second set of index estimates, said second set of index estimates comprising an energy value corresponding to each possible symbol value corresponding to said first transmitted symbol;

determining during a sixth time slice a maximum energy value of said second set of index estimates;

adding during said sixth time slice said second set of index estimates to said stored set of index estimates according to like corresponding symbol value to produce a summed set of index estimates;

uncovering during a seventh time slice a second early energy value by correlating said second early series of symbol estimates with said symbol value corresponding to said maximum energy value of said second set of index estimates;

uncovering during said seventh time slice a second late energy value by correlating said second late series of symbol estimates with said symbol value corresponding to said maximum energy value of said second set of index estimates;

summing during an eighth time slice a difference between said second early energy value and said second late energy value to a second stored timing value; and dual maxima processing during a tenth time slice said summed set of index estimates to produce soft decision data.

14. The method of demodulating a signal of claim 13 wherein said second fixed length set of samples is the same as said third fixed length set of samples.

15. The method of demodulating a signal of claim 13 wherein said second time slice and said fifth time slice occur simultaneously, wherein said third time slice and said sixth time slice occur simultaneously, and wherein said fourth time slice and said seventh time slice occur simultaneously.

16. The method of demodulating a signal of claim 13 wherein said third time slice and said fifth time slice occur simultaneously, and wherein said fourth time slice and said sixth time slice occur simultaneously.

17. The method of demodulating a signal of claim 13 wherein said first stored timing value exceeds a predetermined threshold further comprising the step of advancing in time said first amount in relation to said transmission time.

18. The method of demodulating a signal of claim 13 wherein said second stored timing value exceeds a predetermined threshold further comprising the step of retarding in time said second amount in relation to said transmission time.

19. The method of demodulating a signal of claim 13 wherein said PN sequence comprises a series of PN chips wherein each PN chip has a PN chip duration, and wherein said first fixed length set of samples comprises two samples for each PN chip duration.

20. The method of demodulating a signal of claim 13 wherein said PN sequence comprises a series of PN chips wherein each PN chip has a PN chip duration, and wherein said second stored timing value falls below a predetermined threshold further comprising the step of retarding by one eighth of one PN chip duration in time said second amount in relation to said transmission time.

21. The method of demodulating a signal of claim 13 wherein said PN sequence comprises a series of PN chips wherein each PN chip has a PN chip duration, and wherein said early factor and said late factor are equal to one half PN chip duration.

22. The method of demodulating a signal of claim 13 wherein said step of storing said first set of index estimates comprises the step of adding said first set of index estimates to a previously stored set of index estimates according to like corresponding symbol value wherein said previously stored set of index estimates corresponds to said first transmitted symbol.

23. The method of demodulating a signal of claim 13 wherein said second amount is greater than said first amount and wherein said step of decoding said second symbol estimate causes said step of dual maxima processing.

24. The method of demodulating a signal of claim 13 wherein each symbol in said series of symbols has a symbol duration equal to the reciprocal of said symbol rate and wherein each time slice has a time slice duration and wherein said symbol duration is 32 times larger than said time slice duration.

25. The method of demodulating a signal of claim 13 wherein each symbol in said series of symbols has a symbol duration equal to the reciprocal of said symbol rate and wherein said first amount and said second amount differ by less than one symbol duration.

26. The method of demodulating a signal of claim 13 further comprising the step of summing during said third time slice said maximum energy value corresponding to said first series of symbol estimates with a stored lock detection value.

27. The method of demodulating a signal of claim 13 wherein said second time slice and said fifth time slice occur simultaneously, and wherein said fourth time slice and said seventh time slice and said tenth time slice occur simultaneously.

28. The method of demodulating a signal of claim 13 further comprising the step determining during a ninth time slice a maximum summed energy of said summed set of index estimates.

29. The method of demodulating a signal of claim 28 wherein said second time slice and said fifth time slice occur simultaneously, said third time slice, said sixth time slice and said ninth time slice occur simultaneously, and wherein said fourth time slice and said seventh time slice and said tenth time slice occur simultaneously.

30. The method of demodulating a signal of claim 13 wherein said second time slice and said fifth time slice occur simultaneously, and wherein said third time slice and said sixth time slice and said tenth time slice occur simultaneously.

31. The method of demodulating a signal of claim 13 wherein said series of data bits are Walsh encoded in said fixed length groups.

32. The method of demodulating a signal of claim 13 wherein said step of decoding comprises the step of performing a fast Hadamard transform.

33. A method of demodulating a signal received in a group of signals, wherein said signal is comprised of a series of data bits encoded in fixed length groups into a series of symbols wherein said series of symbols are transmitted at a symbol rate, and wherein said signal is spread spectrum modulated with a pseudonoise (PN) sequence aligned to a transmission time, said method of demodulating comprising the steps of:

despreading a first fixed length set of samples of said signal with said PN sequence offset in time by a first amount from said transmission time to produce at said symbol rate a first series of symbol estimates;

despreading a second fixed length set of samples of said signal with said PN sequence offset from said first amount by an early factor to produce a first early series of symbol estimates;

despreading a third fixed length set of samples of said signal with said PN sequence offset from said first amount by a late factor to produce a first late series of symbol estimates;

decoding during a first time slice a first symbol estimate of said first series of symbol estimates to produce a first set of index estimates, said first set of index estimates comprising an energy value corresponding to each possible symbol value corresponding to a first transmitted symbol;

determining during a second time slice a maximum energy value of said first set of index estimates;

storing during said second time slice said first set of index estimates to produce a stored set of index estimates;

uncovering during a third time slice an early energy value by correlating said first early series of symbol estimates with said symbol value corresponding to said maximum energy value;

uncovering during said third time slice a late energy value by correlating said first late series of symbol estimates with said symbol value corresponding to said maximum energy value;

summing during a fourth time slice a difference between said early energy value and said late energy value to a stored timing value;

despreading a fourth fixed length set of samples of said signal with said PN sequence offset in time by a second amount from said transmission time to produce at said symbol rate a second series of symbol estimates;

despreading a fifth fixed length set of samples of said signal with said PN sequence offset from said second amount by said early factor to produce a second early series of symbol estimates;

despreading a sixth fixed length set of samples of said signal with said PN sequence offset from said second amount by said late factor to produce a second late series of symbol estimates;

decoding during a fifth time slice a second symbol estimate of said second series of symbol estimates to produce a second set of index estimates, said second set of index estimates comprising an energy value corresponding to each possible symbol value corresponding to said first transmitted symbol;

determining during a sixth time slice a maximum energy value of said second set of index estimates;

adding during said sixth time slice said second set of index estimates to said stored set of index estimates according to like corresponding symbol value to produce a summed set of index estimates;

uncovering during a seventh time slice a second early energy value by correlating said second early series of symbol estimates with said symbol value corresponding to said maximum energy value of said second set of index estimates;

uncovering during said seventh time slice a second late energy value by correlating said second late series of symbol estimates with said symbol value corresponding to said maximum energy value of said second set of index estimates; and summing during an eighth time slice a difference between said second early energy value and said second late energy value to a second stored timing value.

34. The method of demodulating a signal of claim 33 wherein said second fixed length set of samples is the same as said third fixed length set of samples.

35. The method of demodulating a signal of claim 33 wherein said second time slice and said fifth time slice occur simultaneously.

36. The method of demodulating a signal of claim 33 wherein said third time slice and said fifth time slice occur simultaneously, and wherein said fourth time slice and said sixth time slice occur simultaneously.

37. The method of demodulating a signal of claim 33 wherein said first stored timing value exceeds a predetermined threshold further comprising the step of advancing in time said first amount in relation to said transmission time.

38. The method of demodulating a signal of claim 33 wherein said second stored timing value exceeds a predetermined threshold further comprising the step of retarding in time said second amount in relation to said transmission time.

39. The method of demodulating a signal of claim 33 wherein said PN sequence comprises a series of PN chips wherein each PN chip has a PN chip duration, and wherein said first fixed length set of samples comprises two samples for each PN chip duration.

40. The method of demodulating a signal of claim 33 wherein said PN sequence comprises a series of PN chips wherein each PN chip has a PN chip duration, and wherein said second stored timing value falls below a predetermined threshold further comprising the step of retarding by one eighth of one PN chip duration in time said second amount in relation to said transmission time.

41. The method of demodulating a signal of claim 33 wherein said PN sequence comprises a series of PN chips wherein each PN chip has a PN chip duration, and wherein said early factor and said late factor are equal to one half PN chip duration.

42. The method of demodulating a signal of claim 33 wherein said step of storing said first set of index estimates comprises the step of adding said first set of index estimates to a previously stored set of index estimates according to like corresponding symbol value wherein said previously stored set of index estimates corresponds to said first transmitted symbol.

43. The method of demodulating a signal of claim 33 wherein each symbol in said series of symbols has a symbol duration equal to the reciprocal of said symbol rate and wherein each time slice has a time slice duration and wherein said symbol duration is 32 times larger than said time slice duration.

44. The method of demodulating a signal of claim 33 wherein each symbol in said series of symbols has a symbol duration equal to the reciprocal of said symbol rate and wherein said first amount and said second amount differ by less than one symbol duration.

45. The method of demodulating a signal of claim 33 further comprising the step of summing during said third time slice said maximum energy value corresponding to said first series of symbol estimates with a stored lock detection value.

46. A communication system comprising a first unit generating a signal which is comprised of a series of data bits encoded in fixed length groups into a series of symbols wherein said series of symbols are transmitted at a symbol rate, and wherein said signal is spread spectrum modulated with a pseudonoise (PN) sequence aligned to a transmission time wherein said system further comprises a second station comprising:

a first demodulation and storage element for receiving in real time a set of samples of said signal and producing at said symbol rate a series of first element symbols which are estimates of said series of symbols wherein said series of first element symbols includes a first element symbol;

a shared transform processor for receiving said series of first element symbols from said first demodulation and storage element and producing at a rate higher than said symbol rate a series of estimates of said series of data bits wherein said series of estimates includes a first series of estimates corresponding to said first element symbol; and a combiner for receiving and storing said first series of estimates;

a maximum detector for receiving said first series of estimates and determining a maximum energy level and corresponding symbol value of said first series of estimates; and a time tracking block for receiving an indication of a symbol value corresponding to said maximum energy level and for providing a timing advance or retard indication to said first demodulation element.

47. The communication system of claim 46 wherein said shared transform processor further for receiving from a second demodulation element a second element symbol and producing a second series of estimates corresponding thereto, and wherein said combiner is further for receiving said second series of estimates, adding said second series of estimates to a stored series of estimates, and for providing a summed series of estimates, said second station further comprising a dual maxima metric for receiving said summed series of estimates and providing a soft decision output corresponding to a first transmitted symbol.

48. The communication system of claim 47 wherein said stored series of estimates is said first series of estimates.

49. The communication system of claim 47 wherein said stored series of estimates is a sum of said first series of estimates and at least one other series of estimates.

50. The communication system of claim 47 wherein said second station further comprises a power control decision block for receiving said soft decision output and providing a power control indication intended for said first unit.

51. The communication system of claim 46 wherein said second station further comprises a lock detector for receiving said maximum energy level and providing an indication as to whether said first demodulation and storage element is assigned to a valid call signal.

52. The communication system of claim 46 wherein said first demodulation and storage element is further for producing a series of early code symbols and late code symbols.

53. The communication system of claim 52 wherein said time tracking block is further for receiving a first early symbol of said series of early code symbols, correlating said first early symbol with said symbol value corresponding to said maximum energy level to produce an early energy level, for receiving a first late symbol of said series of late code symbols, correlating said first late symbol with said symbol value corresponding to said maximum energy level to produce a late energy level, and for finding a difference between said early energy level and said late energy level and using said difference to generate said advance or retard indication.

54. A communication system comprising a first unit generating a signal which is comprised of a series of data bits encoded in fixed length groups into a series of symbols wherein said series of symbols are transmitted at a symbol rate, and wherein said signal is spread spectrum modulated with a pseudonoise (PN) sequence aligned to a transmission time wherein said system further comprises a second station comprising:

a first demodulation and storage element for receiving in real time a set of samples of said signal and producing at said symbol rate a series of first element symbols which are estimates of said series of symbols wherein said series of first element symbols includes a first element symbol;

a shared transform processor for receiving said series of first element symbols from said first demodulation and storage element and producing at a rate higher than said symbol rate a series of estimates of said series of data bits wherein said series of estimates includes a first series of estimates corresponding to said first element symbol; and an integrated search processor for receiving said signal, and for providing a first search symbol and wherein said shared transform processor is further for receiving from said integrated search processor said first search symbol and producing a first search series of estimates.

55. A communication system comprising a first unit generating a signal which is comprised of a series of data bits encoded in fixed length groups into a series of symbols wherein said series of symbols are transmitted at a symbol rate, and wherein said signal is spread spectrum modulated with a pseudonoise (PN) sequence aligned to a transmission time wherein said system further comprises a second station comprising:

a first demodulation and storage element for receiving in real time a set of samples of said signal and producing at said symbol rate a series of first element symbols which are estimates of said series of symbols wherein said series of first element symbols includes a first element symbol;

a shared transform processor for receiving said series of first element symbols from said first demodulation and storage element and producing at a rate higher than said symbol rate a series of estimates of said series of data bits wherein said series of estimates includes a first series of estimates corresponding to said first element symbol; and wherein said communication system further comprises a queuing arbiter for controlling transfer of data from said first demodulation and storage element to said shared transform processor engine.

56. A communication system comprising a first unit generating a signal which is comprised of a series of data bits encoded in fixed length groups into a series of symbols wherein said series of symbols are transmitted at a symbol rate, and wherein said signal is spread spectrum modulated with a pseudonoise (PN) sequence aligned to a transmission time wherein said system further comprises a second station comprising:

a first demodulation and storage element for receiving in real time a set of samples of said signal and producing at said symbol rate a series of first element symbols which are estimates of said series of symbols wherein said series of first element symbols includes a first element symbol;

a shared transform processor for receiving said series of first element symbols from said first demodulation and storage element and producing at a rate higher than said symbol rate a series of estimates of said series of data bits wherein said series of estimates includes a first series of estimates corresponding to said first element symbol; and wherein said first demodulation element comprises:

a pseudonoise (PN) sequence generator for producing a sequence of PN data chips wherein said sequence of PN data chips corresponds to said PN sequence used to modulate said signal in said first unit, wherein first demodulation and storage element produces said sequence of PN data chips at an offset in time from said transmission time;

a decimation multiplexer for receiving data samples of said signal and selecting a portion of said data samples;

a despreader for correlating said portion of said data samples with said sequence of PN data chips and for producing correlated output bits; and a timing generation register for controlling said offset in time of said sequence of PN data chips and said selecting of said portion of said data samples.

57. An communication system comprising a first unit generating a signal which is comprised of a series of data bits encoded in fixed length groups into a series of symbols comprised of a series of code chips wherein said series of symbols are transmitted at a symbol rate, said communication system further comprising a second station comprising:

a first demodulation circuit portion having an input receiving samples of said signal and having an output, said first demodulation circuit portion accumulating energy once per code chip in real time;

a second demodulation circuit portion having an input receiving said samples of said signal and having an output, said second demodulation circuit portion accumulating energy once per code chip in real time;

a shared transform processor coupled to said output of said first and second demodulation circuit portions and having an output, wherein said shared transform processor transforms sets of said accumulated energies once per symbol from each of said first and second demodulation circuit portion in succession; and a pipelined processor coupled to said output of said shared transform processor for assigning a symbol weighting metric once per symbol for each of said first and second demodulation circuit portion in succession.

58. The communication system of claim 57 further comprising a chip buffer disposed between said output of said first demodulation circuit portion and said input of said shared transform processor and disposed between said output of said second demodulation circuit portion and said input of said shared transform processor.

59. The communication system of claim 57 wherein said pipeline processor comprises:

a combiner having an input coupled to said output of said shared transform processor and having an output;

a maximum detector having an input coupled to said output of said shared transform processor and having an output; and a time tracking block having an input coupled to said output of said maximum detector and having an output; wherein said first demodulation circuit portion and said second demodulation circuit portion each have a time tracking input and wherein said output of said time tracking block is coupled to said time tracking input of said first and second demodulation circuit portions.

60. The communication system of claim 59 wherein said pipeline processor further comprises a soft decision decoder having an input coupled to said output of said combiner and having an output.

61. The communication system of claim 60 wherein said pipeline processor further comprises a power control indication having an input coupled to said output of said soft decision decoder.

62. The communication system of claim 59 further comprising a lock detector having an input coupled to said output of said maximum detector and having an output wherein said combiner has a lock detection input coupled to said output of said lock detector.

63. The communication system of claim 57 further comprising an integrated search processor having an input receiving said samples of said signal and having an output coupled to said input of said shared transform processor.

64. The communication system of claim 58 wherein said first and said second demodulation circuit portions have a chip ready output and wherein said chip buffer has a data transfer control input further comprising a queuing arbiter having an input coupled to said chip ready output of said first and said second demodulation circuit portions and having an output coupled to said data transfer control input of said chip buffer.

65. The communication system of claim 58 further comprising an early and late chip buffer having an input coupled to said output of first and said second demodulation circuit portions and having an output.

66. The communication system of claim 65 wherein said pipeline processor comprises:
- a maximum detector having an input coupled to said output of said shared transform processor and having an output; and
- a time tracking block having an input coupled to said output of said maximum detector and having an input coupled to said output of said early and late chip buffer and having an output;

wherein said first demodulation circuit portion and said second demodulation circuit portion each have a time tracking input and wherein said output of said time tracking block is coupled to said time tracking input of said first and second demodulation circuit portion.

67. A system for demodulating a signal received in a group of signals, wherein said signal is comprised of a series of data bits encoded in fixed length groups into a series of symbols wherein said series of symbols are transmitted at a symbol rate, and wherein said signal is spread spectrum modulated with a pseudonoise (PN) sequence aligned to a transmission time, said system comprising:
- a first demodulation element means for despreading a first fixed length set of samples of said signal with said PN sequence offset in time by a first amount from said transmission time to produce at said symbol rate a first series of symbol estimates;
- a shared transform means for decoding during a first time slice a first symbol estimate of said first series of symbol estimates to produce a first set of index estimates, said first set of index estimates comprising an energy value corresponding to each possible symbol value corresponding to a first transmitted symbol;
- a maximum detection means for determining during a second time slice a maximum energy value and corresponding symbol value of said first set of index estimates;
- a combining means for storing during said second time slice said first set of index estimates to produce a stored set of index estimates;
- a second demodulation element means for despreading a fourth fixed length set of samples of said signal with said PN sequence offset in time by a second amount from said transmission time to produce at said symbol rate a second series of symbol estimates;
- wherein said shared transformer is further for decoding during a fifth time slice a second symbol estimate of said second series of symbol estimates to produce a second set of index estimates, said second set of index estimates comprising an energy value corresponding to each possible symbol value corresponding to said first transmitted symbol;
- wherein said maximum detection means is further for determining during a sixth time slice a maximum energy value and corresponding symbol value of said second set of index estimates; and
- wherein said combining means is further for adding during said sixth time slice said second set of index estimates to said stored set of index estimates according to like corresponding symbol value to produce a summed set of index estimates.

68. The system for demodulating a signal of claim 67:
wherein said first demodulation element means is further for despreading a second fixed length set of samples of said signal with said PN sequence offset from said first amount by an early factor to produce a first early series of symbol estimates and for despreading a third fixed length set of samples of said signal with said PN sequence offset from said first amount by a late factor to produce a first late series of symbol estimates; and wherein said second demodulation element means is further for despreading a fifth fixed length set of samples of said signal with said PN sequence offset from said second amount by said early factor to produce a second early series of symbol estimates and for despreading a sixth fixed length set of samples of said signal with said PN sequence offset from said second amount by said late factor to produce a second late series of symbol estimates;

wherein said system further comprises a time tracking means for uncovering during a third time slice an early energy value by correlating said first early series of symbol estimates with said symbol value corresponding to said maximum energy value and for uncovering during said third time slice a late energy value by correlating said first late series of symbol estimates with said symbol value corresponding to said maximum energy value and for summing during a fourth time slice a difference between said early energy value and said late energy value to a first stored timing value and for uncovering during a seventh time slice a second early energy value by correlating said second early series of symbol estimates with said symbol value corresponding to said maximum energy value of said second set of index estimates and is further for uncovering during said seventh time slice a second late energy value by correlating said second late series of symbol estimates with said symbol value corresponding to said maximum energy value of said second set of index estimates and for summing during an eighth time slice a difference between said second early energy value and said second late energy value to a second stored timing value.

69. The system for demodulating a signal of claim 68 wherein said second fixed length set of samples is the same as said third fixed length set of samples.

70. The system for demodulating a signal of claim 67 wherein said second time slice and said fifth time slice occur simultaneously.

71. The system for demodulating a signal of claim 68 wherein said third time slice and said fifth time slice occur simultaneously, and wherein said fourth time slice and said sixth time slice occur simultaneously.

72. The system for demodulating a signal of claim 68 wherein said first stored timing value exceeds a predetermined threshold further comprising the step of advancing in time said first amount in relation to said transmission time.

73. The system for demodulating a signal of claim 68 wherein said second stored timing value exceeds a predetermined threshold further comprising the step of retarding in time said second amount in relation to said transmission time.

74. The system for demodulating a signal of claim 67 wherein said PN sequence comprises a series of PN chips wherein each PN chip has a PN chip duration, and wherein said first fixed length set of samples comprises two samples for each PN chip duration.

75. The system for demodulating a signal of claim 68 wherein said PN sequence comprises a series of PN chips wherein each PN chip has a PN chip duration, and wherein said second stored timing value falls below a predetermined threshold further comprising the step of retarding by one eighth of one PN chip duration in time said second amount in relation to said transmission time.

76. The system for demodulating a signal of claim 68 wherein said PN sequence comprises a series of PN chips wherein each PN chip has a PN chip duration, and wherein said early factor and said late factor are equal to one half PN chip duration.

77. The system for demodulating a signal of claim 67 wherein each symbol in said series of symbols has a symbol duration equal to the reciprocal of said symbol rate and wherein each time slice has a time slice duration and wherein said symbol duration is 32 times larger than said time slice duration.

78. The system for demodulating a signal of claim 67 wherein each symbol in said series of symbols has a symbol duration equal to the reciprocal of said symbol rate and wherein said first amount and said second amount differ by less than one symbol duration.

79. The system for demodulating a signal of claim 67 further comprising a lock detector for summing during a seventh time slice said maximum energy value corresponding to said second set of index estimates with a stored lock detection value.

80. The system of demodulating a signal of claim 79 wherein said combining mean is further for adding said second set of index estimates to a previously stored set of index estimates according to like corresponding symbol value only if said stored lock detection value is above an out-of-lock threshold value.

81. A method of demodulating a signal received in a group of signals, wherein said signal is comprised of a series of data bits encoded in fixed length groups into a series of symbols wherein said series of symbols are transmitted at a symbol rate, and wherein said signal is spread spectrum modulated with a pseudonoise (PN) sequence aligned to a transmission time, said method of demodulating comprising the steps of:

despreading a first fixed length set of samples of said signal with said PN sequence offset in time by a first amount from said transmission time to produce at said symbol rate a first series of symbol estimates;

decoding during a first time slice a first symbol estimate of said first series of symbol estimates to produce a first set of index estimates, said first set of index estimates comprising an energy value corresponding to each possible symbol value corresponding to a first transmitted symbol;

determining during a second time slice a maximum energy value of said first set of index estimates;

storing during said second time slice said first set of index estimates to produce a stored set of index estimates;

despreading a fourth fixed length set of samples of said signal with said PN sequence offset in time by a second amount from said transmission time to produce at said symbol rate a second series of symbol estimates;

decoding during a fifth time slice a second symbol estimate of said second series of symbol estimates to produce a second set of index estimates, said second set of index estimates comprising an energy value corresponding to each possible symbol value corresponding to said first transmitted symbol;

determining during a sixth time slice a maximum energy value of said second set of index estimates; and adding during said sixth time slice said second set of index estimates to said stored set of index estimates according to like corresponding symbol value to produce a summed set of index estimates.

82. The method of demodulating a signal of claims 81 further comprising the steps of:

despreading a second fixed length set of samples of said signal with said PN sequence offset from said first amount by an early factor to produce a first early series of symbol estimates;

despreading a third fixed length set of samples of said signal with said PN sequence offset from said first amount by a late factor to produce a first late series of symbol estimates;

uncovering during a third time slice an early energy value by correlating said first early series of symbol estimates with said symbol value corresponding to said maximum energy value;

uncovering during said third time slice a late energy value by correlating said first late series of symbol estimates with said symbol value corresponding to said maximum energy value;

summing during a fourth time slice a difference between said early energy value and said late energy value to a stored timing value;

despreading a fifth fixed length set of samples of said signal with said PN sequence offset from said second amount by said early factor to produce a second early series of symbol estimates;

despreading a sixth fixed length set of samples of said signal with said PN sequence offset from said second amount by said late factor to produce a second late series of symbol estimates;

uncovering during a seventh time slice a second early energy value by correlating said second early series of symbol estimates with said symbol value corresponding to said maximum energy value of said second set of index estimates;

uncovering during said seventh time slice a second late energy value by correlating said second late series of symbol estimates with said symbol value corresponding to said maximum energy value of said second set of index estimates; and summing during an eighth time slice a difference between said second early energy value and said second late energy value to a second stored timing value.

83. The method of demodulating a signal of claim 82 wherein said second fixed length set of samples is the same as said third fixed length set of samples.

84. The method of demodulating a signal of claim 81 wherein said second time slice and said fifth time slice occur simultaneously.

85. The method of demodulating a signal of claim 82 wherein said third time slice and said fifth time slice occur simultaneously, and wherein said fourth time slice and said sixth time slice occur simultaneously.

86. The method of demodulating a signal of claim 82 wherein said first stored timing value exceeds a predetermined threshold further comprising the step of advancing in time said first amount in relation to said transmission time.

87. The method of demodulating a signal of claim 82 wherein said second stored timing value exceeds a predetermined threshold further comprising the step of retarding in time said second amount in relation to said transmission time.

88. The method of demodulating a signal of claim 81 wherein said PN sequence comprises a series of PN chips wherein each PN chip has a PN chip duration, and wherein said first fixed length set of samples comprises two samples for each PN chip duration.

89. The method of demodulating a signal of claim 82 wherein said PN sequence comprises a series of PN chips wherein each PN chip has a PN chip duration, and wherein said second stored timing value falls below a predetermined threshold further comprising the step of retarding by one eighth of one PN chip duration in time said second amount in relation to said transmission time.

90. The method of demodulating a signal of claim 82 wherein said PN sequence comprises a series of PN chips wherein each PN chip has a PN chip duration, and wherein said early factor and said late factor are equal to one half PN chip duration.

91. The method of demodulating a signal of claim 81 wherein said step of storing said first set of index estimates comprises the step of adding said first set of index estimates to a previously stored set of index estimates according to like corresponding symbol value wherein said previously stored set of index estimates corresponds to said first transmitted symbol.

92. The method of demodulating a signal of claim 81 wherein each symbol in said series of symbols has a symbol duration equal to the reciprocal of said symbol rate and wherein each time slice has a time slice duration and wherein said symbol duration is 32 times larger than said time slice duration.

93. The method of demodulating a signal of claim 82 wherein each symbol in said series of symbols has a symbol duration equal to the reciprocal of said symbol rate and wherein said first amount and said second amount differ by less than one symbol duration.

94. The method of demodulating a signal of claim 81 further comprising the step of summing during said third time slice said maximum energy value corresponding to said first series of symbol estimates with a stored lock detection value.

\* \* \* \* \*